United States Patent
Francoeur et al.

(10) Patent No.: US 12,094,674 B2
(45) Date of Patent: Sep. 17, 2024

(54) BI-STABLE ELECTROMAGNETIC ACTUATOR

(71) Applicant: HYDRO-QUÉBEC, Montréal (CA)

(72) Inventors: Bruno Francoeur, Beloeil (CA); Pierre Couture, Boucherville (CA)

(73) Assignee: HYDRO-QUÉBEC, Montréal (CA)

( * ) Notice: Subject to any disclaimer, the term of this patent is extended or adjusted under 35 U.S.C. 154(b) by 556 days.

(21) Appl. No.: 17/291,176

(22) PCT Filed: Nov. 5, 2018

(86) PCT No.: PCT/CA2018/051391
§ 371 (c)(1),
(2) Date: May 4, 2021

(87) PCT Pub. No.: WO2020/093132
PCT Pub. Date: May 14, 2020

(65) Prior Publication Data
US 2022/0130630 A1    Apr. 28, 2022

(51) Int. Cl.
*H01H 50/18*      (2006.01)
*H01H 47/22*      (2006.01)
(Continued)

(52) U.S. Cl.
CPC ............ *H01H 50/18* (2013.01); *H01H 47/22* (2013.01); *H01H 50/02* (2013.01); *H01H 50/44* (2013.01)

(58) Field of Classification Search
CPC ........ H01H 50/18; H01H 47/22; H01H 50/44; H01H 33/6662; H01F 2007/185; H01F 2007/1692; H01F 7/13; H02K 33/16
(Continued)

(56) References Cited

U.S. PATENT DOCUMENTS 3,035,139 A    5/1962   Lindsay
3,218,409 A    11/1965  Lindsay
(Continued)

FOREIGN PATENT DOCUMENTS

EP    1975960 A1    10/2008
EP    2551881 A1    1/2013
(Continued)

OTHER PUBLICATIONS

P. Barkan, "A Study of the Contact Bounce Phenomenon," in IEEE Transactions on Power Apparatus and Systems, vol. PAS-86, No. 2, pp. 231-240, Feb. 1967, doi: 10.1109/TPAS.1967.291840.
(Continued)

*Primary Examiner* — Danny Nguyen
(74) *Attorney, Agent, or Firm* — Womble Bond Dickinson (US) LLP

(57) ABSTRACT

A bistable electromagnetic actuator is described. The actuator includes a mobile assembly and a fixed assembly. The mobile assembly includes at least one pair of ferromagnetic plunger-cores, a frame integrally connecting the plunger-cores, and a guiding element. The fixed assembly includes a ferromagnetic core having cavities defined on each of its two sides configured to receive a corresponding one of the plunger-cores, at least one magnet positioned between the cavities in the core and being able to create a first magnetic flux, at least one coil operable via an excitation current to create a second magnetic flux, and a guiding element adapted to cooperate with the guiding element of the mobile assembly to allow the mobile assembly to move between a first and a second stable position. Methods for actuating the bistable electromagnetic actuator are also described.

45 Claims, 17 Drawing Sheets

(51) Int. Cl.
*H01H 50/02* (2006.01)
*H01H 50/44* (2006.01)

(58) Field of Classification Search
USPC .................................................. 361/42–50
See application file for complete search history.

(56) References Cited

U.S. PATENT DOCUMENTS

| | | | |
|---|---|---|---|
| 3,783,423 | A | 1/1974 | Mater et al. |
| 4,847,726 | A | 7/1989 | Mody |
| 5,912,604 | A | 6/1999 | Harvey et al. |
| 6,009,615 | A | 1/2000 | McKean et al. |
| 6,084,492 | A | 7/2000 | Cereda et al. |
| 7,102,475 | B2 | 9/2006 | Nakagawa et al. |
| 7,639,460 | B2 | 12/2009 | Couture et al. |
| 2015/0248984 | A1* | 9/2015 | Bachmaier ............. H01H 51/27 361/160 |
| 2020/0135421 | A1* | 4/2020 | Chapel .................. H01H 47/02 |
| 2020/0266008 | A1* | 8/2020 | Lindell .................. H01H 3/26 |

FOREIGN PATENT DOCUMENTS

| | | |
|---|---|---|
| EP | 2608226 B1 | 12/2015 |
| GB | 2289374 B | 2/1998 |
| JP | 2001/256868 A | 9/2001 |
| WO | WO1990001788 A1 | 2/1990 |
| WO | WO2003030188 A1 | 4/2003 |

OTHER PUBLICATIONS

E. Dullni and S. Zhao, "Bouncing phenomena of vacuum interrupters," 24th ISDEIV 2010, 2010, pp. 463-466, doi: 10.1109/DEIV.2010.5625822.

Pierre Couture, Smart Power Line and photonic de-icer concepts for transmission-line capacity and reliability Improvement, Cold Regions Science and Technology, vol. 65, Issue 1, 2011, pp. 13-22, ISSN 0165-232X.

International Search Report and Written Opinion issued for International application No. PCT/CA2018/051391, May 14, 2020.

* cited by examiner

BI-STABLE ELECTROMAGNETIC ACTUATOR

CROSS-REFERENCE TO RELATED APPLICATIONS

This application is a national stage application under 35 U.S.C. § 371 of International Application PCT/CA2018/051391, filed Nov. 5, 2018, which is hereby incorporated by reference herein in its entirety.

FIELD OF THE INVENTION

The present invention relates to a bistable electromagnetic actuator. The actuator may be used to actuate the contacts of a vacuum interrupter in an electrical power transmission system. A magnetic circuit of a linear electromagnetic actuator comprising an electrical coil and a permanent magnet is described. In an embodiment, the actuator is a bistable linear actuator. In an embodiment, the actuator is a single current driven bi-directional force actuator. In an embodiment, the actuator includes a regenerative braking mode.

BACKGROUND

Alternating current electrical transmission or distribution networks include circuit breakers located at line inputs to interrupt the electrical current in case of an overload or short-circuit incident on the electrical network, or to carry out switching operations. In medium voltage AC electrical networks (1 to 35 kilovolts), circuit breakers use an interrupter located in a sealed bottle containing a high vacuum, commonly called a "vacuum interrupter" as one of the means to break or form a conductive connection. The vacuum interrupter has a fixed contact mounted at one of the two inner ends of the bottle, and a mobile contact attached to the other end via bellows to allow the mobile contact to move. During assembly, a high vacuum is pumped around the contacts and the bottle is sealed. Once assembled, the mobile contact can move linearly to separate the contacts. When the contacts are moved apart, the differential between the vacuum and ambient pressure exerts a force to close the contacts. This force is also combined with a force caused by the elastic deformation of the bellows. This force of the bellows, which has a smaller amplitude, is added to or subtracted from the force due to the pressure differential depending on whether the bellows is stretched or compressed. This results in a net restoring force to close the contacts.

Separating the contacts of a vacuum interrupter in an inductive connection of a medium voltage network carrying an alternating current wave causes an arc to occur. The arc propagates in plasma metal vapor from the eroded molten metal of the surface where the root of the arc is located on the contact that assumes the role of the cathode. This electric arc can then persist up until the end of the alternation, at the next zero crossing of the current. At the zero crossing, the energy to maintain the active plasma is missing and the plasma is extinguished. Depending on the speed at which the contacts are separated, the residual presence of metal vapor can cause the dielectric barrier to be insufficient to support the recovery voltage appearing across it, initiating a new arc that can persist up until the next zero current. This cycle can be repeated over a few alternations while the contacts are separated away until the dielectric barrier attained is sufficient to prevent any re-ignition. Once the metal vapor is completely dissipated, the high vacuum provides a dielectric strength in excess of 200 kV when the contacts are held at a gap prescribed by the manufacturer. This prescribed gap thus dictates the movement of the mobile contact. Inversely, when the contacts are closed on an electrified connection blocking an alternating voltage wave, the dielectric strength weakens as the contacts move closer together. During the last third of the movement, the average voltage across the contacts can exceed the dielectric strength such that an arc can occur across the gap between the contacts before they come together. If a point of contact is made at the root of the arc, the contact will be on molten metal. Once hardened, this metal can create a weld point that must be broken at the next opening.

The life expectancy of a vacuum interrupter on an alternating current network can be extended by reducing contact wear due to the presence of an arc. In some cases, the duration of arcing can be limited when opening the interrupter by actuating the contacts a predetermined amount of time ahead in advance of the next zero-crossing of the alternating current. The contacts are then quickly separated to obtain a sufficient gap when this zero crossing is reached to definitively extinguish the arc. In other cases, it is possible to limit the formation of an arc when closing the interrupter by actuating the contacts a predetermined amount of time in advance of the next zero crossing of the voltage alternation. This amount of time in advance is determined to close the last millimetres of gap within an interval that includes this zero crossing and that is short enough to limit the duration and intensity of the initiated arc. In both cases, the contact actuation must be fast and synchronized with the alternating electrical network.

The vacuum interrupter also has a limited ability to allow current to flow. On a microscopic scale, the contact surfaces are rough. Because of this roughness, the effective contact area is only a fraction of the total area available when the contacts are closed. Reducing the contact area increases the resistance to current flow and thus increases the Joule heating. The effective cross-section can be increased by applying pressure to the contacts. In addition, the constriction of the current flow through the contact points produces a repulsive magnetic force which tends to separate the contacts, and therefore, to reduce the effective cross-section. The restoring force already exerts a constant pressure on the contacts, which is associated with a maximum permissible current. To increase this maximum, an external force must be superimposed once the contacts are closed.

The contacts of the vacuum interrupter are actuated via a linear actuator. The actuator generates a mechanical acceleration force that causes the mobile contact attached to the bellows to move rapidly and in a straight line over several millimeters from the open to the closed positions and vice versa. In the open position, the actuator must sustain the restoring force. In the closed position, the actuator must add to the restoring force a pressure force at the contact points to increase the maximum allowable current. During actuation, the movement duration depends on the amount of mechanical force applied to accelerate the mobile mass comprising the mobile contact and the mobile assembly of the actuator mechanism. During acceleration, the mobile mass acquires kinetic energy that will be transferred to the structure upon impact at the end of the movement.

The behavior of the contacts following impact on the closing of the vacuum interrupter depends essentially on the properties of the whole structure, including the part on which the vacuum interrupter is mounted. When the mobile contact, accelerated by a force, impacts the fixed contact with a certain speed, the kinetic energy acquired by the mobile mass is transmitted to the structure. When the vacuum interrupter is first put into service, it undergoes a break-in period. The terminals supporting the contacts are made of low oxygen copper. This copper is annealed during the assembly of the cylinder, making it relatively soft. The first impacts of a closure with the actuator will then cause the contact point to break down due to copper creep. However, repeated impacts gradually harden the copper to a point that, after about 100 closures, it is now resistant to deformation. The greater the kinetic energy acquired by the mobile mass in the chosen closure mode, the more significant the breakdown will be. For subsequent impacts, the document "A Study of the Contact Bounce Phenomenon", IEEE Transactions on Power Apparatus and Systems, Vol. PAS-86, No. 2, pp. 231-240, mentions that the closing of electrical contacts is almost invariably accompanied by a series of bounces whose characteristic amplitude of a few thousandths of an inch persists for a few milliseconds. Upon impact, some of the kinetic energy dissipates into the structure, and some is stored as potential energy in an elastic deformation. This potential energy will then be restored to the mobile mass by elasticity, again dissipating part of the energy in the structure, such that it goes back in the opposite direction. By maintaining the force, the mobile contact then performs a few bounces until all the kinetic energy is totally dissipated in the structure. In the meantime, each bounce initiates an arc that causes additional wear by melting the metal at the root of the arc. In addition, the propagation of repeated shock waves exerts fatigue in the materials which accelerates the aging of the mechanical components.

One of the mechanical components sensitive to fatigue is the bellows. By deforming, the bellows allow the mobile contact to move while maintaining the vacuum around the contacts. Additionally, the impact at the end of the movement suddenly stops the end of the bellows that is attached to the mobile contact, and this impulse movement imposed on the bellows can make it oscillate. The bellows undergoes a small plastic deformation, in addition to its elastic deformation, each time the mobile contact is actuated. This repeated back and forth movement eventually cracks the bellows, resulting in the loss of vacuum. The vacuum interrupter therefore has a limited number of actuations, which affects its service life. It is possible to extend the life of the interrupter by changing the way the mobile contact is actuated.

Introducing a cushion or a hydraulic damper in the mechanism is practiced solution to dissipate kinetic energy, to limit bouncing and to prolong the life of the device. It is also possible to decouple a portion of the mobile mass of the actuator from the mass of the mobile contact by inserting an adapter between the two. The adapter includes a piston attached to the moving mass of the actuator that compresses a spring against the moving contact when it impacts the fixed contact. Some of the kinetic energy of the actuator's mobile mass is then stored in the spring, rather than being transferred to the contact point. However, these solutions add parts to the mechanism. Another solution is to limit the kinetic energy at impact by minimizing the mobile mass of the actuator and by acting on the way the force is applied.

The manufacturer generally recommends a limit to the duration of bouncing when closing a vacuum interrupter. According to the document "Bouncing Phenomena of Vacuum Interrupters", XXIVth Int. Symp. On Discharges and Electrical Insulation in Vacuum, Braunschweig, 2010, the bounce duration in circuit breakers incorporating vacuum interrupters varies from device to device, even if they have the same design. Therefore, it is not possible to define a reasonable bounce duration for a specific circuit breaker. Bounce is considered an intrinsic aspect that is difficult to control. Therefore, the way to limit bounce in a vacuum interrupter using the actuator is not obvious.

Opening the contact is itself less demanding. It is necessary to stop the movement of the mobile contact when the gap prescribed by the manufacturer is reached. The actuating mechanism must therefore include a stop to limit the movement. On the one hand, the movement must not allow the mobile contact to exceed the prescribed distance so as not to over-compress the bellows, since over-compression increases the fatigue of the material forming the bellows, resulting in a reduction of its life expectancy. On the other hand, it is expected that the impact at the end of the movement will also be followed by bounce. Care must be taken to maintain a sufficient gap at bounce to prevent reigniting an arc between contacts.

The document U.S. Pat. No. 7,639,460 discloses a switching apparatus with vacuum interrupters driven by actuators for switching phase subconductors in bundles on an extra high voltage transmission line. Switching apparatuses are mounted on each of the three phases and are distributed along the line to form segments of a few tens of kilometers each. The subdivision of the line into segments allows to limit to less than 35 kilovolts the voltage drop induced by the phase current flowing through the segment impedance. Thus, vacuum interrupter technology developed for the medium voltage electrical network can be used. In a first application, the switching apparatus is used to modulate the line impedance to control the power flow. The vacuum interrupters are switched in real time to vary the number of conductors involved in the power flow in order to modulate the impedance of the line segment connecting it to the next apparatus. By generalized control of all the switching apparatuses distributed over a line of several hundred to several thousand kilometers, it is then possible to rapidly modulate the impedance of the entire line with excellent resolution. Modulating the impedance of several interconnected lines in an electrical network allows, among other things, to control the flow of electricity on each of the arteries in order to increase the transit capacity. In a second application, the switching apparatus is used to de-ice the line. In icy situations, the vacuum interrupters of the switch are switched to concentrate the current of one phase in a single subconductor on the concerned line segment. The concentration of current in the subconductor increases its temperature rise and melts the ice formation at the junction between the ice and the conductor surface causing it to fall to the ground. The switching sequence is performed to concentrate the current in turn in each of the subconductors of each phase to remove all ice on the line. For both modes of operation, each vacuum interrupter switches a current through a subconductor with an inductive impedance that causes an arc to form between the contacts.

The installation of an embedded switching apparatus on the extra high voltage line in a large electrical network makes it difficult to access for maintenance. This accessibility is exacerbated when the apparatuses are distributed over thousands of kilometers of line in an often-uninhabited area. Since access is difficult, we expect this equipment to have a life expectancy equivalent to that of the line. However, real-time modulation of the impedance of a line with switching apparatuses requires the repeated operation of vacuum interrupters. This can represent several hundreds of thousands of switching operations to be performed over the life of a line. The failure of a switch on a line segment beam, whether by mechanism breakage, premature contact wear, or material fatigue, is therefore a risk. To reduce the risk of failure due to mechanism breakage, the actuator should have the minimum number of mobile parts. To reduce the risk of failure due to premature wear of the contacts, the actuator must actuate them rapidly in synchronism with the AC electrical network. To reduce the risk of failure due to material fatigue, the actuator must reduce the impact of the mobile mass at the end of the movement and limit bounce.

A switching apparatus consists of several vacuum interrupters actuated by actuators, the number of which depends on the number of bundled subconductors to be switched on the line. The housing of the switching apparatus must provide the space to contain them in a relatively small volume. To limit the space requirement, the actuator must be compact.

The electrical constraints on the vacuum interrupter in the switching apparatus are a function of the current flowing in the line and the voltage drop induced by this current flowing through at least one of the subconductors on the line segment separating them from the next switching apparatus. However, the connection in the line cannot be interrupted, because all the voltage in the line would appear across the switching apparatus. In the event of a short circuit fault, the switching apparatus must carry the short circuit current until the line is tripped by a circuit breaker located upstream in a substation. Regardless of the situation, the switching apparatus must always ensure the continuity of the line on at least one of its sub-conductors. In addition, it must counteract the restoring force between the contacts when a short-circuit current flows and also compensate for the accidental loss of the cylinder seal, which contributes to maintaining pressure on the contacts through the restoring force. To ensure line continuity, the actuator must produce a significant holding force on the closed contacts.

The operation of a vacuum interrupter in a switching apparatus installed in an electrical network can also be carried out under difficult weather conditions. In particular, climatic conditions can be conducive to the formation of frost. Frost can accumulate in the gaps between the fixed and mobile parts until an ice bridge is formed that impedes movement. If this happens, the actuating force may not be sufficient to break the ice bridge, and the actuator will remain locked. To prevent contact blockage in the event of ice, the actuator must include a means to break the ice bridge.

To actuate its vacuum interrupter, each switching apparatus includes an energy conversion system to convert electrical energy into actuating kinetic energy. Electrical energy is drawn by two means directly from the phase to avoid the isolation constraints of a power supply from a grounded point. The first means uses a plate supported by the live apparatus with insulators to capture the electric field emanating from the surface. The second means uses a coil on a core encircling the current flowing on the phase to capture the magnetic field. The captured electrical energy is then stored in a capacitive reservoir to provide electrical power to the conversion system. In both cases, the physical size of the means depends on the amount of energy consumed by the system to manage and actuate the vacuum interrupters, and as mentioned earlier, the switching apparatus has a space constraint.

Among the state-of-the-art linear actuators used to actuate a vacuum interrupter are bistable spring mechanisms. In these actuators, a spring is gradually deformed by pressing a lever with compressed air or by using a small motor to store mechanical energy in the spring which is then locked with a latch. Activating a release device releases this energy through a system of cams, toggles and levers to quickly switch the vacuum interrupter contacts between open and closed modes. Between operations, these same bistable spring mechanisms maintain a static compression force on the contacts in the closed mode, and a static spreading force in the open mode. However, these spring mechanisms have several mobile parts that increase the risk of breakage.

The documents U.S. Pat. Nos. 3,218,409 and 3,035,139 propose to remove parts from the actuator mechanism using the magnetic attraction force produced in a variable magnetic resistance gap by an electromagnet. The electromagnet has a plunger-core that can move on an axis relative to a stationary core, with the cores made of a ferromagnetic material. The pair forms a closed-loop magnetic path with a gap of variable spacing to allow the flow of magnetic field lines generated by an electric current flowing in the conductor of a coil entwined through the path window. The magnetic flux flowing through the gap exerts a magnetic attraction force on the plunger-core in the direction of movement on the axis, which causes a reduction in the magnetic resistance on the looped path. However, the force acts on the plunger-core only in one direction. To actuate the movement in both directions, it is proposed to couple the plunger-core of the electromagnet with a restoring force exerted by a spring in the opposite direction to that of the decreasing resistance of the gap (Monostable actuator). When the electromagnet coil is not energized, the spring maintains pressure on the plunger-core at one end of the movement. By energizing the magnetic circuit, a force is created that opposes the spring causing the plunger-core to swing to the other end of the movement. When the end of the movement is reached, the energized magnetic circuit is maintained with a small current to hold the position. To swing the plunger-core back in the other direction, the magnetic circuit is deactivated and the plunger-core is returned by spring force. An inconvenience of this arrangement is that the volume and weight of the magnetic circuit must be increased to compensate for the opposing force of the spring and a current must be maintained to keep one of the two positions.

The documents WO9001788, U.S. Pat. No. 5,912,604 and GB2289374 propose to introduce in the magnetic circuit of the monostable actuator the field produced by a permanent magnet. This field replaces the one produced by the holding current necessary to counter the spring force and maintain the position at the end of the movement. The use of the magnet thus eliminates the energy consumption between two actuations. When the plunger-core needs to be flipped to the other end of the movement, a current of predetermined polarity is injected into the coil to counteract the magnet field and give the greater balance of the force to the spring.

The document U.S. Pat. No. 7,639,460 proposes to use a bistable spring mechanism that is connected to a linear motor to actuate a vacuum interrupter in a switching apparatus. This system controls the current injected into the linear motor to produce an actuating force to move the spring mechanism. Although the use of a linear motor offers additional advantages over solenoid actuators, such as a servo-controlled force, the bistable spring mechanism has several parts that increase the risk of failure.

The documents WO9001788, WO03030188, U.S. Pat. Nos. 6,009,615 and 6,084,492 propose to use two electromagnets and the field of a permanent magnet to eliminate both the holding current and the use of spring (Bistable permanent magnet actuator). The magnetic circuit also includes a second coil wrapped around a second magnetic path, having on the same axis of movement of the plunger-core, a second gap whose magnetic resistance decreases in the opposite direction to that of the first path. The movement of the plunger-core in one direction increases the magnetic resistance of one gap while decreasing that of the other, and vice versa. In the absence of current in the coils, both gaps remain magnetized by the field of the magnet, and each gap exerts an electromagnetic attractive force on the plunger-core to pull it in its direction. The two gaps of the actuator are shaped to create a position on the axis of motion where the forces on the plunger-core are in equilibrium, and to provide the greater balance of forces to the gap located in the direction of motion away from this point to close this gap and create a holding force with the magnet (bistable function). To switch the actuator to the opposite position, a unidirectional current of a predetermined direction is injected into the coil on the side of the open-gap. The field lines emanating from the coil are superimposed on those emanating from the magnet causing the greater balance of the forces to be transferred to the open-gap and force the movement. When the end of the movement is reached, the current is cut off, and this gap in turn obtains the greater balance of the forces to maintain the position.

An inconvenience with the actuators described in the previous paragraph resides in the large portion of the inertial mass of the plunger-core that is part of the mobile mass that must be accelerated with the force produced by these electromagnets. This force is produced by the variation of the magnetic energy contained in the electromagnet's magnetic circuit, minus the losses, with respect to the displacement of the plunger-core. In the magnetic circuit of a non-magnetically saturated actuator, the magnetic energy is concentrated in the gap volume through which the field flows. The ferromagnetic parts of the circuit, which contain little energy, including the plunger-core, serve as a means to channel the field towards the gaps. In an actuator such as those in the cited documents, a significant portion of the length of the path followed by the magnetic field lines flows through the plunger-core. The plunger-core therefore represents a significant portion of the circuit and its total mass. This greater mass to be accelerated also accentuates the kinetic energy at the end of the movement and the resulting shock wave in the structure. These actuators are not compact, because they have a low (actuating force)/(mobile mass) ratio.

Another inconvenience with these actuators is the characteristic that they produce an actuation force that only reaches a maximum at the end of the movement or at another predetermined point along the movement. The fact that the force is not maintained over the course of the movement reduces the integral of the accelerating force applied to the mobile mass and therefore also affects the actuation speed. To increase the actuation speed, the actuator must be enlarged.

Another inconvenience with these actuators is the functional assignment of the direction of the force created by the unidirectional current flowing in one of the two coils to the direction of movement of the plunger-core for the intended operation. These actuators assign the respective function of opening the vacuum interrupter to the injection of a unidirectional current in a first coil, and closing the vacuum interrupter to the injection of a unidirectional current in a second coil. This is a single action mode of actuation where the mobile assembly is accelerated as it progresses toward the end of its movement and reaching the end of the movement is terminated by an impact followed by bounces. Assigning each coil a different action increases the size of the actuator, as the coils are underutilized and take up more space in the magnetic circuit.

All of the actuators in the cited documents disclose apparatuses for actuating a circuit breaker in an electrical power system that have different modes of operation than a switching apparatus on a transmission line. However, the actuators in the state of the art have much room for improvement to make them more suitable for actuating a vacuum interrupter in a switching apparatus mounted on a very high voltage transmission line.

SUMMARY OF THE INVENTION

According to one aspect, a bistable electromagnetic actuator for actuating at least one mobile contact of a vacuum interrupter is provided. The actuator includes a mobile assembly and a fixed assembly. The mobile assembly includes: at least one pair of facing ferromagnetic plunger-cores, each plunger-core having a body comprising a protuberance with sidewalls, and a cap; a frame integrally connecting the plunger-cores; and a guiding element. The fixed assembly includes: a ferromagnetic core having two opposite sides, the ferromagnetic core having cavities defined on each of the sides configured to receive a corresponding one of the plunger-cores from the mobile assembly, each cavity having sidewalls defining a first gap between them and each sidewall of each cavity defining a second gap with the opposite sidewall of its corresponding plunger-core, the opposite sides of the ferromagnetic core respectively facing opposite surfaces of the caps of the plunger-cores, each side of the core defining a third gap with the opposite surface of the corresponding cap at least one magnet positioned between the cavities in the core and, said at least one magnet being suitable to create a first magnetic flux in the first, second and third gaps; at least one coil operable via from an excitation current to create, a second magnetic flux in the first, second and third gaps; and a guiding element adapted to cooperate with the guiding element of the mobile assembly to allow the mobile assembly to move between a first and a second stable position.

According to one aspect, a method is provided for actuating a mobile contact of a vacuum interrupter to break or form a conductive connection, the mobile contact being connected to a mobile assembly of a bistable electromagnetic actuator. The method comprises the steps of: a) flowing an energizing current I through a coil of the actuator in a first direction to produce magnetic flux in the actuator causing the mobile assembly to tilt from a first stable position to a second stable position; and b) when the mobile assembly is in motion toward the second stable position, flowing the energizing current I through the coil in a second direction opposite the first direction.

DETAILED DESCRIPTION

Figure 1:
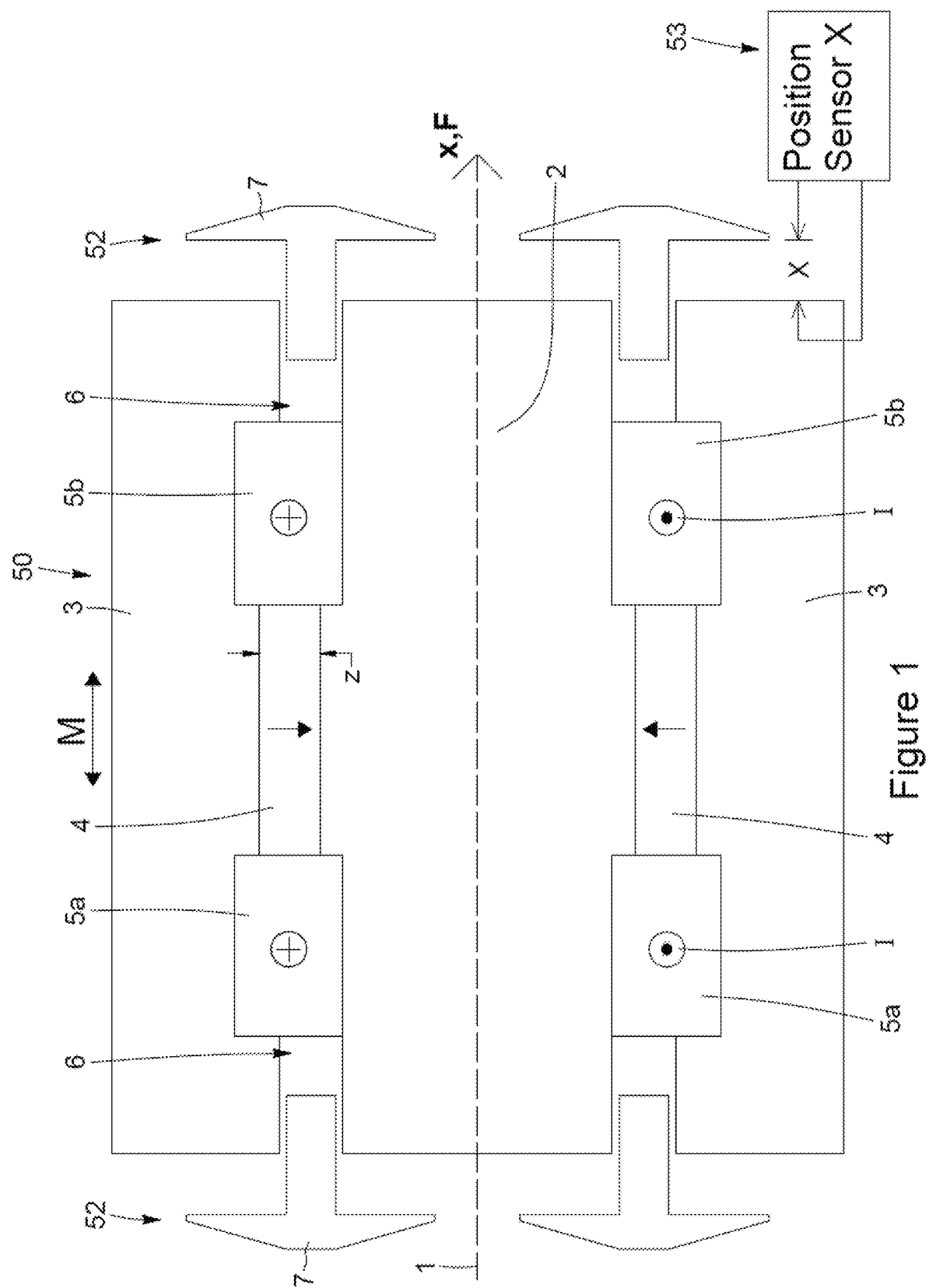
FIG. 1 is a schematic cross-sectional view showing an electromagnetic actuator according to an embodiment.

With reference to FIG. 1, the magnetic circuit of a bistable permanent magnet actuator is shown according to an embodiment. The support elements are intentionally omitted. The magnetic circuit includes a fixed assembly 50 and a mobile assembly 52. The mobile assembly 52 may move relative to the fixed assembly 50 with a displacement x following a reciprocating motion along axis 1 over a movement M. The displacement x is determined in real time by a position sensor 53. The position sensor 53 may be an encoder or a proximity sensor of optical, inductive, capacitive, or magnetic type.

The fixed assembly 50 comprises a central armature 2 arranged between two lateral armatures 3. All three armatures have the same length in the direction of axis 1. At each end on the axis, the side faces are perpendicular and coplanar. In the present embodiment, the material of the armatures is ferromagnetic, has high magnetic permeability, and is laminated and stacked to a height h perpendicular to the plane of the figure. The armatures together form the core of the actuator.

In the present embodiment, the fixed assembly 50 further comprises two magnets 4, having a rectangular cross-section and a height h, located on either side of the central armature 2. Each magnet 4 has one face positioned against the central armature 2, and has its opposite face positioned against the adjacent lateral armature 3, so as to be wedged between the two armatures. Each magnet 4 has its magnetization dipole perpendicular to the axis 1 and located in the plane of the figure, with the same pole (north or south) oriented to face the central armature 2 that is opposite it. The thickness z of each magnet 4 can be chosen to extract the maximum amount of magnetic energy from the magnet volume.

The fixed assembly 50 further comprises two coils 5a, 5b each comprising a predetermined number of turns of a conductor. The two coils 5a, 5b are wound around the central armature 2 and are located on opposite sides of the two magnets 4. In the present embodiment, each coil 5a, 5b is first pre-rolled onto a support having the same shape as the portion of the central armature 2 on which each coil 5a, 5b is mounted. Each coil 5a, 5b is then mounted on the central armature 2 by sliding it from the corresponding lateral end. Adding the lateral armatures 3 to the assembly is done after this step. Each coil 5a, 5b has two terminals to allow connection to an electrical circuit. In the present embodiment, the terminals of the coils 5a, 5b are connected to the electric circuit in order to obtain, when a current I flows through them, ampere-turns in each of the coils that loop about the axis 1 and the central armature in the same direction of rotation. The direction of flow of the current I in the coils 5a, 5b is illustrated in the figure by a circle containing a dot to signify ampere-turns leaving the plane, and a circle containing a cross to signify ampere-turns entering the plane. The figure shows one of two possible directions, the other being the opposites of the directions shown. In the present embodiment, the coils 5a, 5b are electrically connected in series to be provided with the same current I.

The fixed core is further characterized in that the central armature 2 and the two lateral armatures 3 extend past each of the coils 5a, 5b for a predetermined distance to form four rectangular cavities 6. Each cavity 6 is intended to receive a plunger-core 7, which may, for example, be configured in a T-shape. In the present embodiment, the plunger-core material 7 is also ferromagnetic, laminated and stacked to the same height h perpendicular to the plane of the figure. The four plunger-cores 7 fit into the mobile assembly 52 of the actuator. They are grouped on a support or frame, not shown, to form two mechanically integral pairs, the two pairs being respectively located at the ends of the fixed core on axis 1 and arranged in opposition to face each other. A displacement x of the mobile assembly 52 on axis 1 forces, on the one hand, the pair of plunger-cores 7 located at one end to enter the cavities 6 and, on the other hand, the pair of plunger-cores 7 located at the opposite end to exit the cavities 6, and vice versa. In some embodiments, if the geometry of the cavities 6 and the plungers 7 are the same on both ends, the volume of the gaps between the plunger 7 and core surfaces will remain constant as the mobile assembly 52 moves along the axis.

Figure 2:
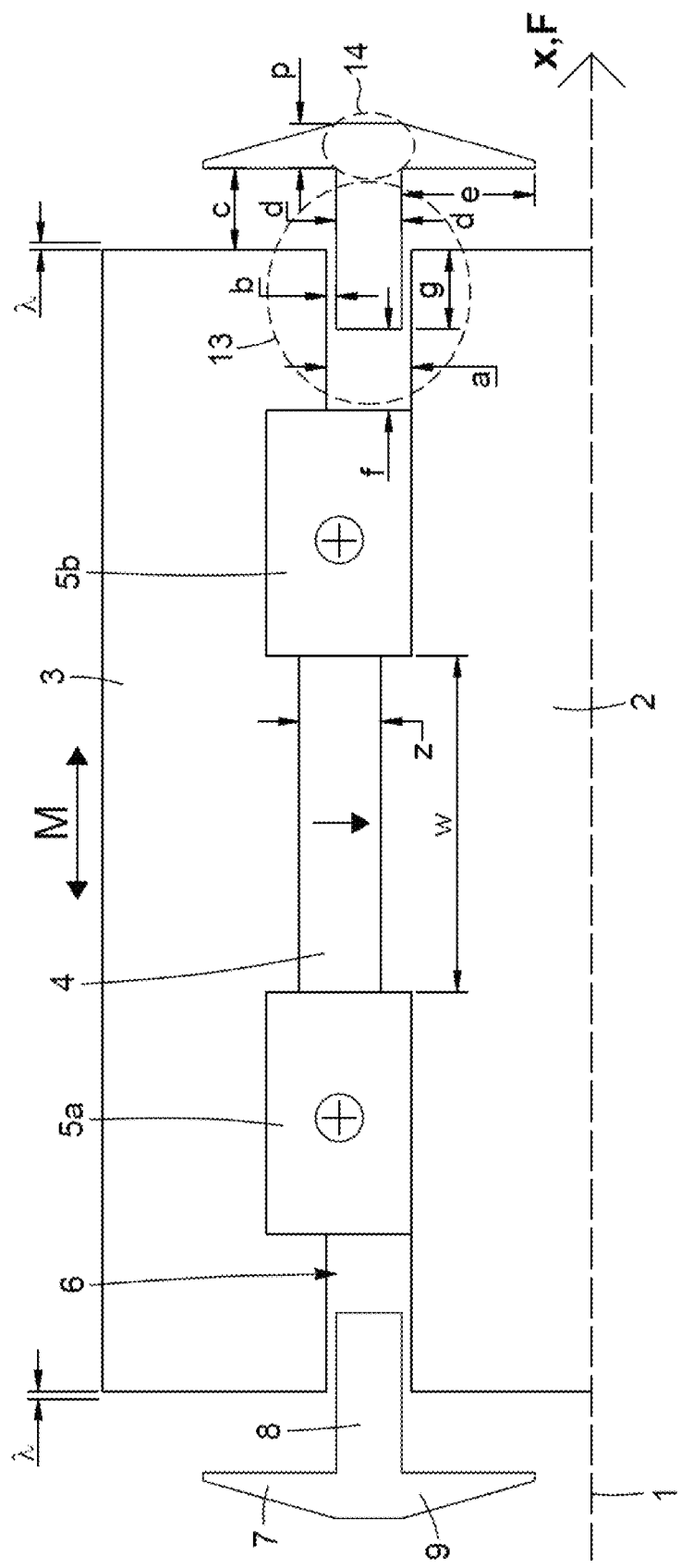
FIG. 2 is a mirror-image portion of the magnetic circuit in FIG. 1 with respect to an axis of symmetry.

The magnetic circuit of the actuator in the present embodiment is symmetric in the plane of the figure with respect to axis 1, with the ampere-turns turning in the opposite direction on one side with respect to the other. The electromagnetic phenomena created on one side of the axis are then the mirror image of those created on the other side. The description of the phenomena can therefore be carried out with reference to only a portion of the magnetic circuit in the figure that is bordered by one side of the axis 1, as shown in FIG. 2. In the following description, each reference made to an element in FIG. 2 also applies to the mirrored element located on the other side of the axis of symmetry 1 in FIG. 1. For example: the magnitude of the magnetic attractive force exerted on a plunger-core 7 in FIG. 2 is doubled on the mobile assembly of the actuator in FIG. 1 by the presence of the mirrored plunger-core 7 located on the other side of the axis 1.

With reference to FIG. 2, each cavity 6 forms a gap a with its plunger-core 7, the gap having a depth h and width f that varies with x. Each plunger-core 7 comprises a rectangular protuberance 8 with a cap 9 at its base. The protuberance 8 has a thickness d smaller than the gap a with a spacing $2b$. Each protuberance 8 of a plunger-core 7 is aligned with the cavity 6 facing it and can move in the cavity 6 forming on each side with its adjacent wall a gap b having a depth h and a width g that varies with x. The cap 9 of plunger-core 7 extends on each side of the protuberance 8 to form between the cap 9 and one of the side faces of the fixed core a gap c that varies with x, and had a width e and depth h. When we refer in this description to the geometry of an opposite plunger-core (i.e.: located on the left in FIG. 2), the geometric parameters are annotated with an apostrophe (a', b', c', d', e', f', g').

The ends of the movement M correspond to the gap c=0 at one end, and c'=0 at the other end. By associating x=0 with c=0, the possible displacement x of the movable assembly 52 is bounded by 0≤x≤M. In the present embodiment, the gaps c and c' are limited to a minimum λ, (c≥λ, c'≥λ). The displacement x of the movable assembly is therefore limited to a movement reduced to λ≤x≤(M−λ). The minimum λ in the gap c or c' can be provided, for example, by mechanical stops installed on the actuator. The mechanical stop may comprise a cushioned mechanism, for example a thin rubber pad of thickness λ secured to each of the side faces of the cores 2 and 3, in the gaps c and c'. In the present embodiment, the movement of the movable assembly 52 does not allow the protuberance 8 to completely exit their cavities 6 (g>0, g'>0).

The operation of the present invention will now be described on the basis of certain basic principles of electromagnetism. In a gap i intersecting a ferromagnetic core of high permeability over a width j and a depth k, applying a magnetomotive force E across gap i produces a magnetic flux density in this gap given by $B_i=\mu_0 \cdot \varepsilon/i$, when edge effects and the effect of saturation in the iron are neglected, and where $\mu_0$ represents vacuum permeability. To this magnetic flux density $B_i$ corresponds a volumetric density of magnetic energy contained in this gap and equivalent to $B_i^2/2\mu_0=\mu_0 \cdot \varepsilon^2/2i^2$. This gap i limits a volume $i \cdot j \cdot k$ which then encompasses a magnetic energy $W_i=\mu_0 \cdot \varepsilon^2 j \cdot k/2i$. In the present embodiment, a magnetomotive force applied directly to the gaps bounding a cavity 6 between the armatures 2 and 3 causes a magnetic flux to pass directly through a gap a and indirectly through two successive gaps b or c via the relevant plunger-core 7. The energy in each gap is then approximately equivalent to the following.

Gap a: $W_a=\mu_0 \cdot \varepsilon^2 \cdot h \cdot f/2a$

Gap b: $W_b=\mu_0 \cdot \varepsilon^2 \cdot h \cdot g/8b$

Gap c: $W_c=\mu_0 \cdot \varepsilon^2 \cdot h \cdot e/8c$

The presence of this energy in these gaps produces a magnetic force of attraction exerted on the plunger-core 7 that is equivalent to the rate of change of the magnetic energy contained in these gaps relative to the displacement of the plunger-core 7 which is only free to move along x, i.e: $\Sigma dW_i/dx$. The actuating force in the present embodiment results from the superposition of two distinct magnetic forces, namely: the magnetic force $F_p$ exerted on the protuberance 8 by the gaps a and b; and the magnetic force Ft exerted on the cap 9 by the gaps c. For the plunger-core 7 located on the right on axis 1 of FIG. 2, we have the derivatives dx=df=−dg=dc. The two magnetic forces $F_p$ and $F_t$ are then expressed as:

$F_p=dW_a/dx+2dW_b/dx=dW_a/df-2dW_b/dg=\frac{1}{2} \cdot \mu_0 \cdot \varepsilon^2 \cdot h \cdot (1/a-\frac{1}{2}b)$ $F_t=2dW_c/dx=2dW_c/dc=\frac{1}{4}\mu_0 \cdot \varepsilon^2 \cdot h \cdot e/c^2$ The force $F_p$ shows a subtraction between two terms ($1/a-\frac{1}{2}b$). And since a=2b+d, we can reformulate the equation of the force $F_p$ by:

$$F_p=-\frac{1}{2}\mu_0 \cdot \varepsilon^2 \cdot h \cdot (d/2b)/(d/2b+1) \quad (1)$$

Figure 3:
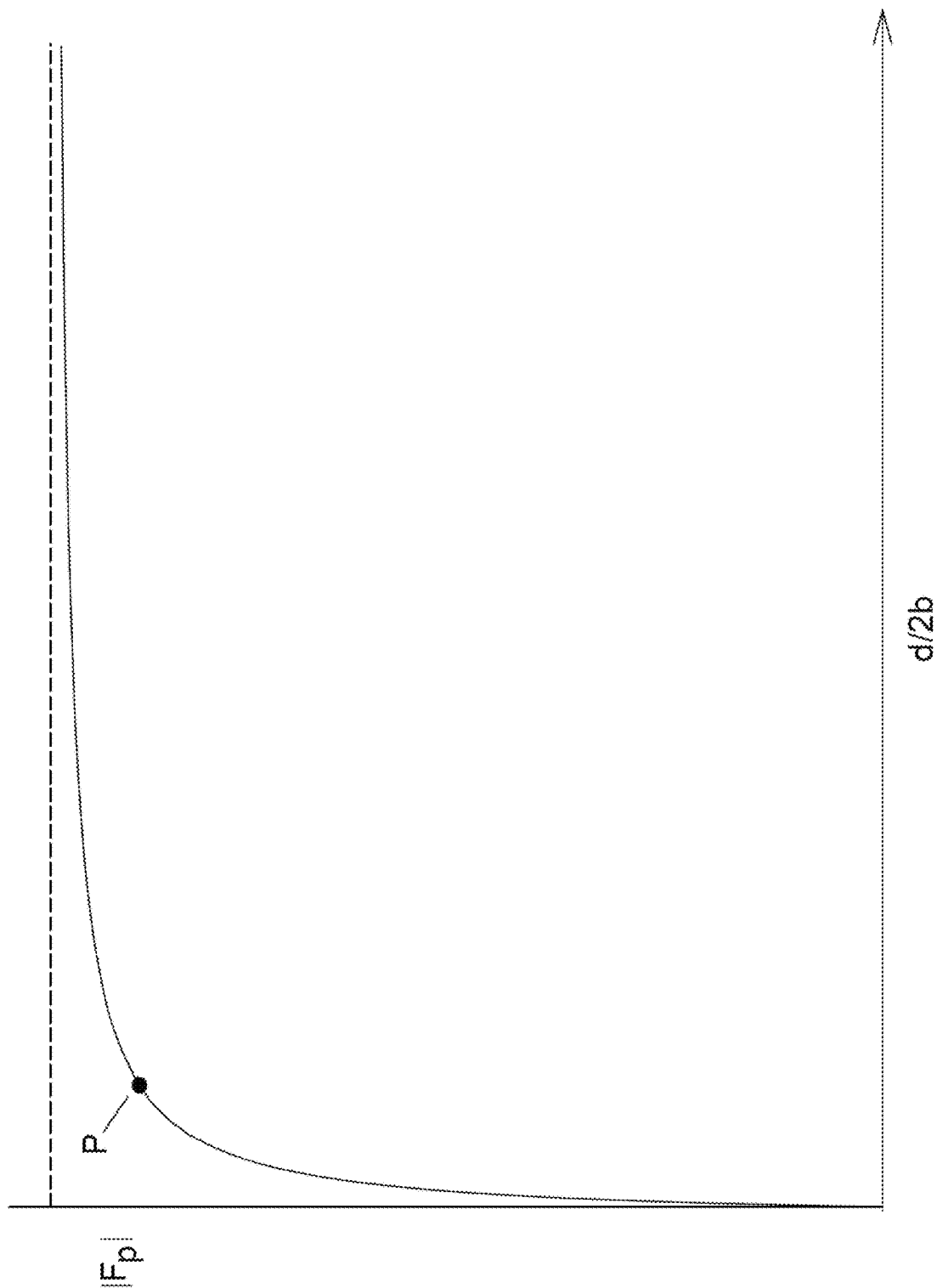
FIG. 3 is a graph showing the force exerted on a core in relation to a ratio of two geometric parameters.

The module force $F_p$ ($|F_p|$) from equation (1) is plotted in FIG. 3 as a function of the ratio d/2b. According to the curve, thickening the protuberance 8 (increasing d/2b) no longer provides a significant gain to the force $|F_p|$ which peaks beyond a point P located on the knee of the curve. Going beyond this point only makes the mobile assembly unnecessarily heavy. In the present embodiment, the choice of ratio d/2b centers the force $|F_p|$ on the knee of the curve around point P to maximize the force $|F_p|$ while limiting the weight to achieve a high force to mass ratio.

In the force equations $F_p$ and $F_t$, the geometric parameters h, a, b and e are constant, and only c varies directly with x (c=x). The magnetic forces can therefore be approximated by the following, $F_p=K_1 \cdot \varepsilon^2$ $F_t=-K_2 \cdot \varepsilon^2/x^2$ where $K_1$ and $K_2$ are positive constants defined by the geometry of the gaps bounding the plunger-core 7.

For the plunger-core 7 located on the left on axis 1 (parameters with an apostrophe), we have the derivatives dx=−df'=dg'=−dc'. And since the plunger-cores 7 at the ends are mechanically linked, the variation of the gaps at each end is limited by the movement M of the mobile assembly with x'=M−x. The magnetic forces give the following.

$F'_p=-K'_1 \cdot \varepsilon'^2$ $F'_t=K'_2 \cdot \varepsilon'^2/(M-x)^2$

The force on the mobile assembly is then approximated by the sum of the following two components.

$F_{mp}=K_1 \cdot \varepsilon^2-K'_1 \cdot \varepsilon'^2$ $$F_{mt}=K'_2 \cdot \varepsilon'^2/(M-x)^2-K_2 \cdot \varepsilon^2/x^2 \quad (2)$$

The force components on the mobile assembly depend on the magnetomotive forces applied to the gaps. The magnetic circuit of the present embodiment uses two magnetomotive forces to magnetize the gaps: the magnet 4 and the ampere-turns in the coils 5. The magnet 4 creates a first magnetic dipole interposed between the plunger-cores 7 and perpendicular to the axis 1 that applies essentially the same magnetomotive force $\varepsilon_a$ directly to the gaps of the plunger-cores 7 arranged in parallel in the magnetic circuit. This magnetomotive force $\varepsilon_a$, however, is only a fraction of that which the magnet 4 produces. The other fraction is across the gap physically filled by magnet 4. The ampere-turns flowing through the coils 5a, 5b create a second magnetic dipole oriented along axis 1 that produces a magnetomotive force εb essentially distributed over the gaps of the plunger-cores 7 placed in series.

In the magnetic circuit of FIG. 2, the plunger-cores 7 and cavities 6 are identical ($K_1=K'_1$, $K_2=K'_2$). For a current I=0 ($\varepsilon=\varepsilon'=\varepsilon_a$), the magnetic forces exerted by the protuberances 8 in equation (2) cancel out regardless of x, and the resulting magnetic force $F_m$ on the mobile assembly is then attributable solely to the presence of the caps 9.

$$F_m=F_{mt}=K_2 \cdot \varepsilon_a^2[1/x^2-1/(M-x)^2] \quad (3)$$

This equation assumes a constant magnetomotive force is applied across the gaps of the plunger-cores 7. However, the length of the gaps c and c' changes with x. This change therefore influences the distribution of the magnetomotive force produced by the magnet between the resistance of the gap it occupies and $\varepsilon_a$ across the plunger-core gaps. Nevertheless, this approximation correctly explains the behavior of the caps 9 in the magnetic circuit of the present embodiment. Returning to FIG. 2, the presence of the caps 9 in the magnetic circuit serves to introduce an offset in the magnetic force exerted on the mobile assembly at the end of the movement. Equation (3) shows that the difference between the respective magnetic forces of the caps 9 gives zero at an intermediate position x=M/2 of the movement, and grants the greater balance of the magnetic force to the cap 9 closest to the fixed core beyond either side of this position. The magnetic force of attraction exerted at the end of the movement on the cap 9 located very close to the fixed core dominates over that exerted on the cap 9 of the opposite plunger-core 7. A numerical simulation using the finite element method and in the linear mode (without saturation) of the magnetic circuit of the actuator in FIG. 2 shows this behavior. The simulation produced the force curve $F_m$ represented by the broken line 10 in FIG. 4 for a position x covering $\lambda \leq x \leq (M-\lambda)$, and where the positive direction of each axis is indicated by an arrow on axis 1 of FIGS. 1 and 2. As with the trend expressed by equation (3), the force $F_m$ is zero at an intermediate point and increases nonlinearly toward the ends of the movement. The symmetry in the geometry of the gaps c and c' on either side of the fixed core creates an inverted symmetry of the force balance on the position axis with respect to a point at the center of the movement. However, it is possible to eliminate the symmetry and increase the balance of forces for one side of the movement by unbalancing, for example, the width e between the two opposing plunger-cores 7.

When a current I flows through the coils 5, a magnetomotive force produced by the ampere-turns $\varepsilon_b$ is added to that $\varepsilon_a$ of the magnet 4 and thus affects the flow of flux. Depending on the direction given to the current I, a fraction $\eta$ of the magnetomotive force of the coils 5a, 5b adds to that of the magnet 4 at the gaps bounding the left-hand plunger-core 7, $\varepsilon'=\varepsilon_a+\eta\varepsilon_b$, and the remaining fraction $1-\eta$ subtracts from that of the magnet 4 at the gaps bounding the right-hand plunger-core 7, $\varepsilon=\varepsilon_a-[1-\eta]\varepsilon_b$. The inverse applies for a current I in the opposite direction, $\varepsilon'=\varepsilon_a-\eta\varepsilon_b$; $\varepsilon=\varepsilon_a-[1-\eta]\varepsilon_b$. For the plunger-core 7 located on the side where there is subtraction, the energy in its gaps fades and thus it experiences a weaker attractive force. For the plunger-core 7 located on the side where there is an addition, the energy in its gaps increases and therefore it experiences a stronger attractive force. Thus, the current I in the coils 5a, 5b grants the greater balance of force to one of the plunger-core 7 as determined by the direction of the current I, with the difference of the balance of forces depending on the amplitude of the current I.

Figure 4:
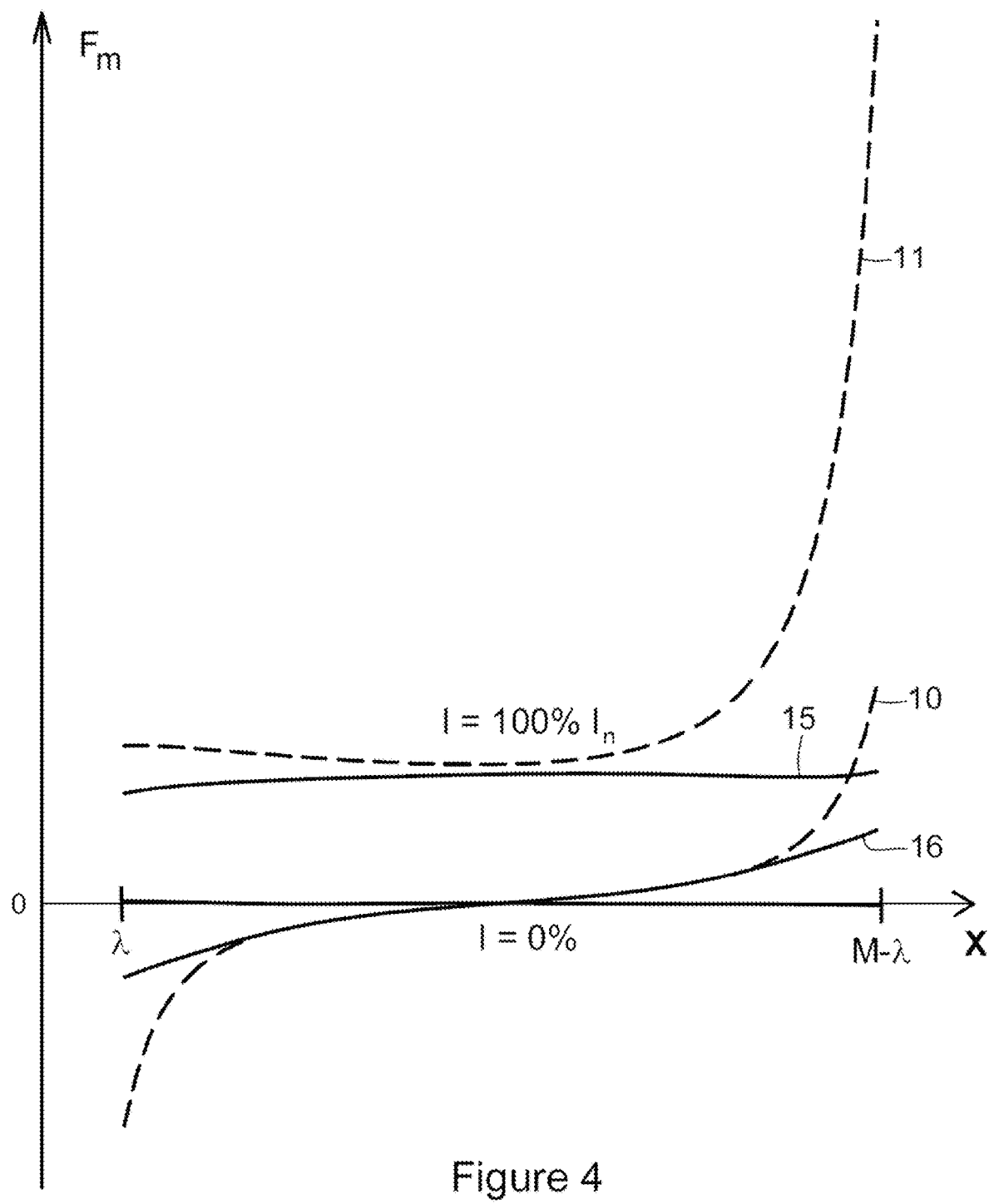
FIG. 4 is a graph showing curves of the force profile exerted on the mobile assembly of the actuator of FIGS. 1 and 2 as a function of position for zero and nominal current in a condition with and without magnetic saturation.

The dashed line 11 in FIG. 4 shows the profile of the force $F_m$ obtained in the simulation by injecting in the coils 5a, 5b of the linear model (not saturated) a current I equal to 100% of a so-called nominal amplitude $I_n$ (I=100% $I_n$). The nominal current $I_n$ corresponds to the level where the resulting magnetomotive force across the gaps of a plunger-core 7 is essentially zero, the targeted one being determined by the polarity of current I. In the absence of a significant magnetomotive force in the gaps of the right plunger-core 7, the mechanical displacement force then results almost solely from the magnetic force of attraction exerted on the left plunger-core 7. The profile of the broken line 11 shows a relatively constant portion over the first two-thirds of the movement from the left before increasing rapidly over the last third of the movement. This force profile is associated with the dominance of the $F_{mp}$ force component over the $F_{mt}$ component over the first two thirds of the movement. However, the force $F_{mp}$ is independent of position and depends only on the magnetomotive force, as given by equation (2). As we approach the end of the left movement, the force $F_{mt}$ becomes significant and is added to the force $F_{mp}$. The resulting force $F_m$ then grows rapidly and nonlinearly near the end of the movement.

When the current I exceeds 100% $I_n$, the fraction of the magnetomotive force $\varepsilon_b$ subtracted becomes greater than that from the magnet $\varepsilon_a$ at the gaps bounding the right-side plunger-core 7. The resulting magnetomotive force is no longer zero and now progresses in a negatively increasing manner. An attractive force reappears on the right plunger-core 7 which fights against the left one. This has the consequence of limiting the growth of the force on the mobile assembly. In the present embodiment, the force $F_m$ is therefore optimal for a current I=100% $I_n$.

The expression and simulation of the forces have so far been formulated in the absence of saturation in the magnetic core. In reality, the magnetization of the ferromagnetic material that composes the fixed core and the plunger-cores 7 reaches saturation when the magnetic field becomes high. The geometry must therefore be adjusted to avoid saturation if the non-linear force profile of the dashed lines 10 and 11 in FIG. 4 is to be maintained in some embodiments. In other embodiments, the nonlinear force profile on the mobile assembly is linearized by adjusting the geometry causing magnetic saturation in certain predetermined areas to achieve a relatively constant force throughout the movement A x (M A) for a current I=100% $I_n$. The simulation was run again with a current I=100% $I_n$, this time using a nonlinear magnetization curve representative of the behavior of an iron-silicon magnetic sheet. From a series of simulations, the width w of the magnet and the ratio of thickness p at the base of cap 9 to width e, (p/e), were adjusted causing magnetic saturation in regions 13 and 14 as soon as the right plunger-core 7 reaches two-thirds of the movement, where $F_{mp}$ force becomes significant and adds to the $F_{mp}$ force, until the relatively constant profile shown by the solid line 15 in FIG. 4 is achieved. Saturation in region 14 also attenuates the end-of-movement force profile for current I=0, as shown by solid line 16. The magnitude of this end-of-movement force corresponds to a significant holding force compared to the force produced for a current I=100% $I_n$. With this magnetic circuit, in addition to being bistable, the actuator of the present embodiment has the advantage of producing a relatively constant actuating force throughout its movement.

Figure 5:
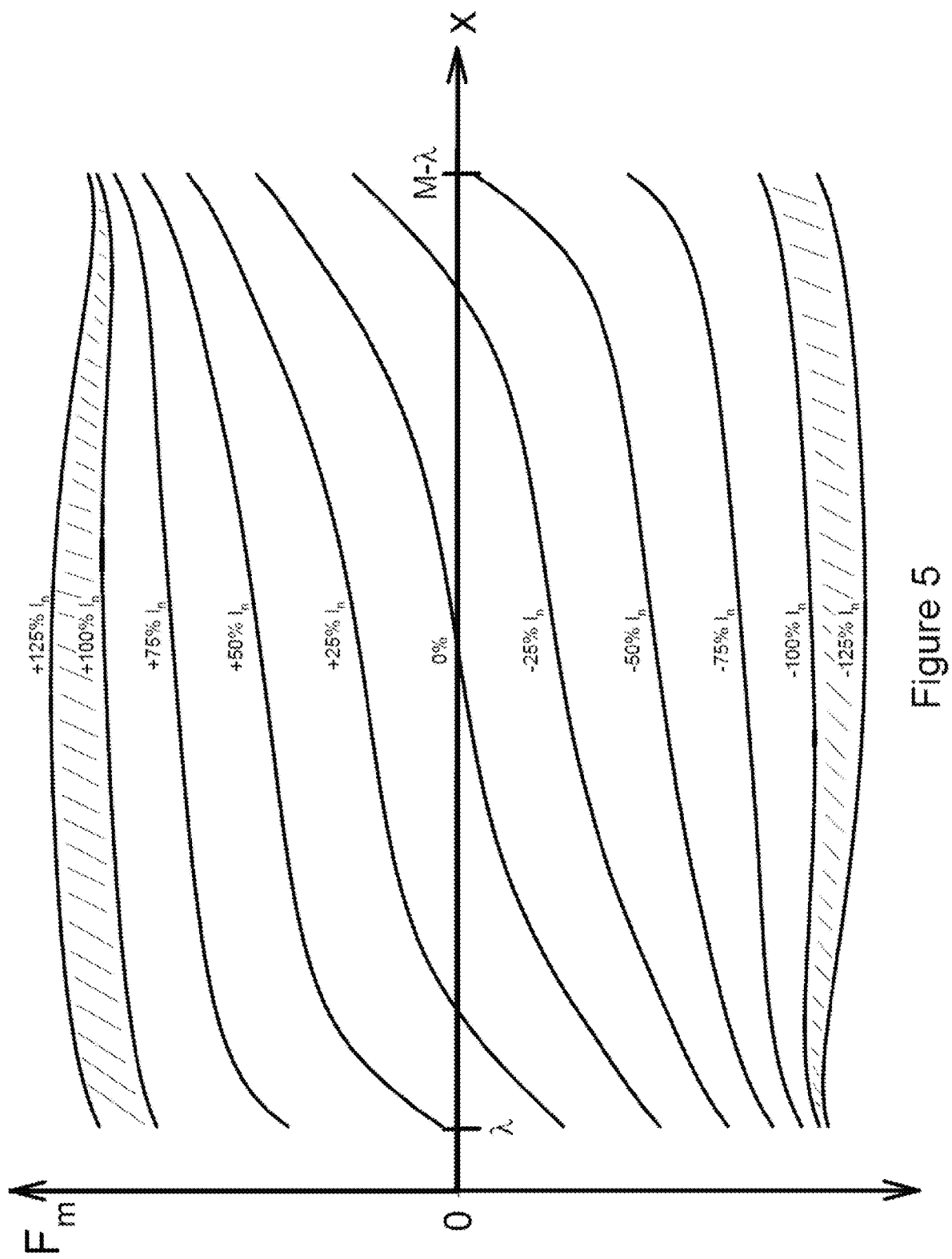
FIG. 5 is a graph showing curves of the force exerted on the mobile assembly of the actuator of FIGS. 1 and 2 as a function of position for different current levels and with magnetic saturation.

An actuator was built with the non-linear magnetic circuit geometry from the numerical simulation. This actuator was then installed on a test bench in a laboratory to measure the force produced as a function of position for current levels/in the coils varying from −125% to +125% of the nominal current $I_n$ with an increment of 25%. FIG. 5 shows the profiles of the force Fm measured as a function of position x for $\lambda \leq x \leq (M-\lambda)$ and for each level of current I injected. The curves show the progressive distortion obtained on the balance of forces by gradually increasing the current I in the coils for both polarities. The progressive increase in current I shifts the force balance point along the movement axis until granting the greater balance of force to a single plunger-core 7 over the entire movement as soon as the current I exceeds about 50% of the nominal current $I_n$, with the polarity of the current determining which plunger-core gets it. The profile of the force curve $F_m$ measured for a current I=100% $I_n$ confirms the curve 15 in FIG. 4. In the present embodiment, the balance of force granted to the targeted plunger-core 7 thus remains relatively constant along the movement by the effect of magnetic saturation in regions 13 and 14. Measurements show that this relatively constant force balance is maintained for a current I in a band bounded by 100% $I_n$ and 125% $I_n$. For a current I within the band, the gaps bounding the plunger-core 7 where the magnetomotive force of the coils subtracts from that of the magnets encompass negligible energy compared to that encompassed in the gaps bounding the opposite plunger-core 7. This energy imbalance, at its maximum, produces an attractive force on a targeted plunger-core 7 without the opposition of a significant force from the opposite plunger-core, and vice versa, depending on the polarity of the applied current I. This maximizes the force density of the actuator with the benefit of making it more compact. With the magnetic circuit of the present invention, it is therefore possible to induce a relatively constant force on the mobile assembly at any position on the movement, and in both directions by reversing the polarity of current I, (I=+/−$I_n$).

Figure 6:
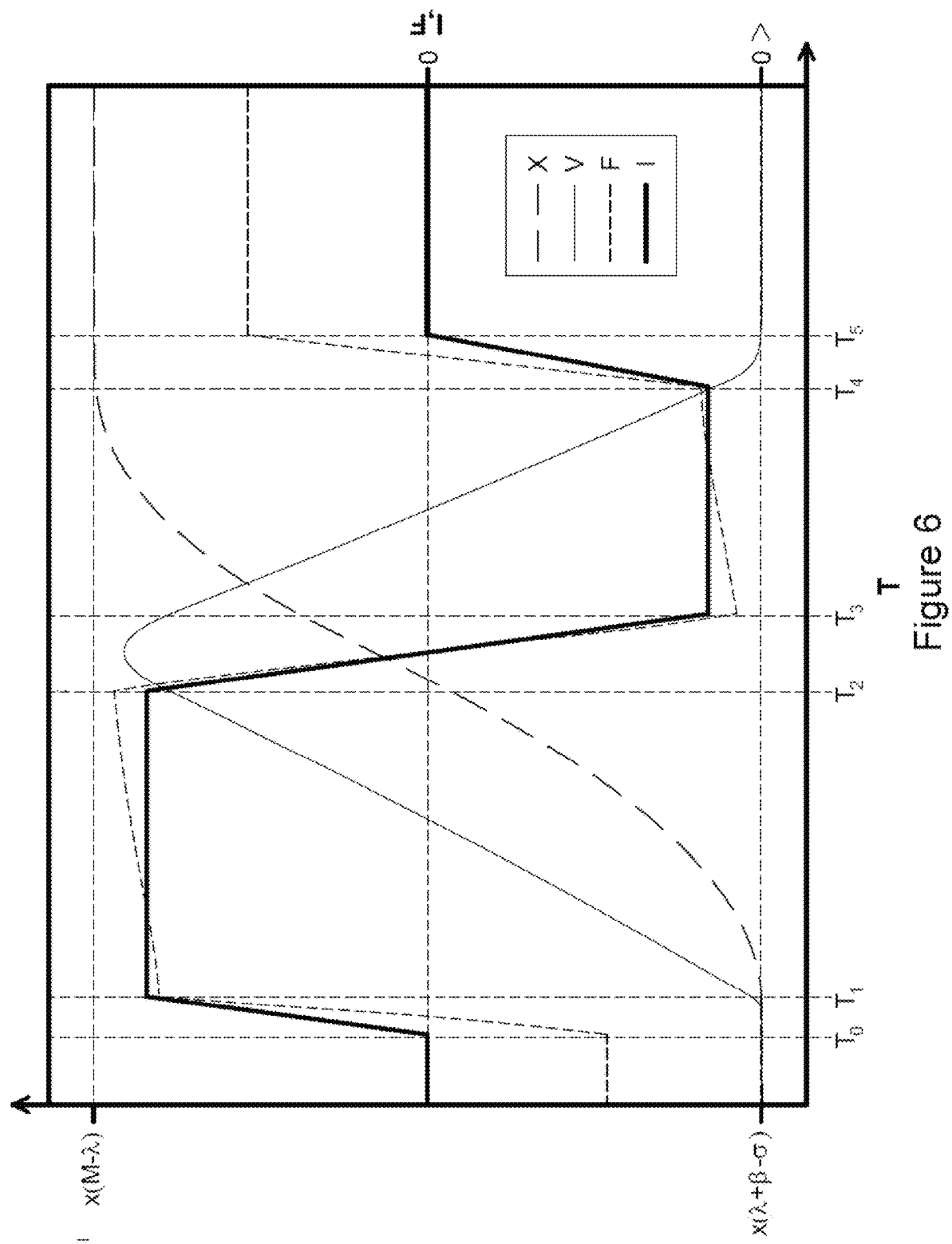
FIG. 6 is a graph showing the position, velocity, force, and current of the actuator as a function of position in a drive mode.
Figure 7:
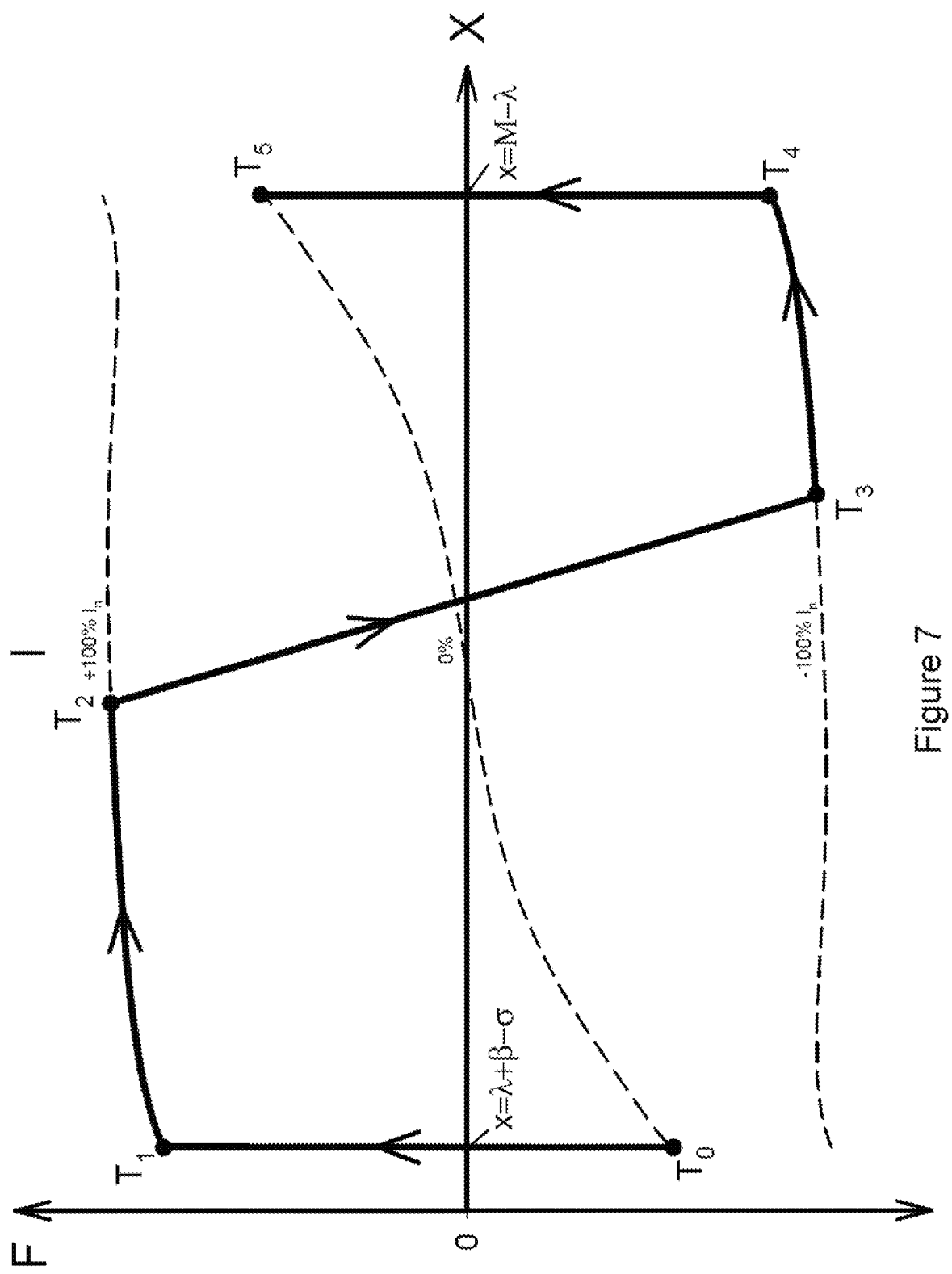
FIG. 7 is a graph showing the force produced by the actuator in relation to position and the evolution of the current controlled at different instants in time.
Figure 17:
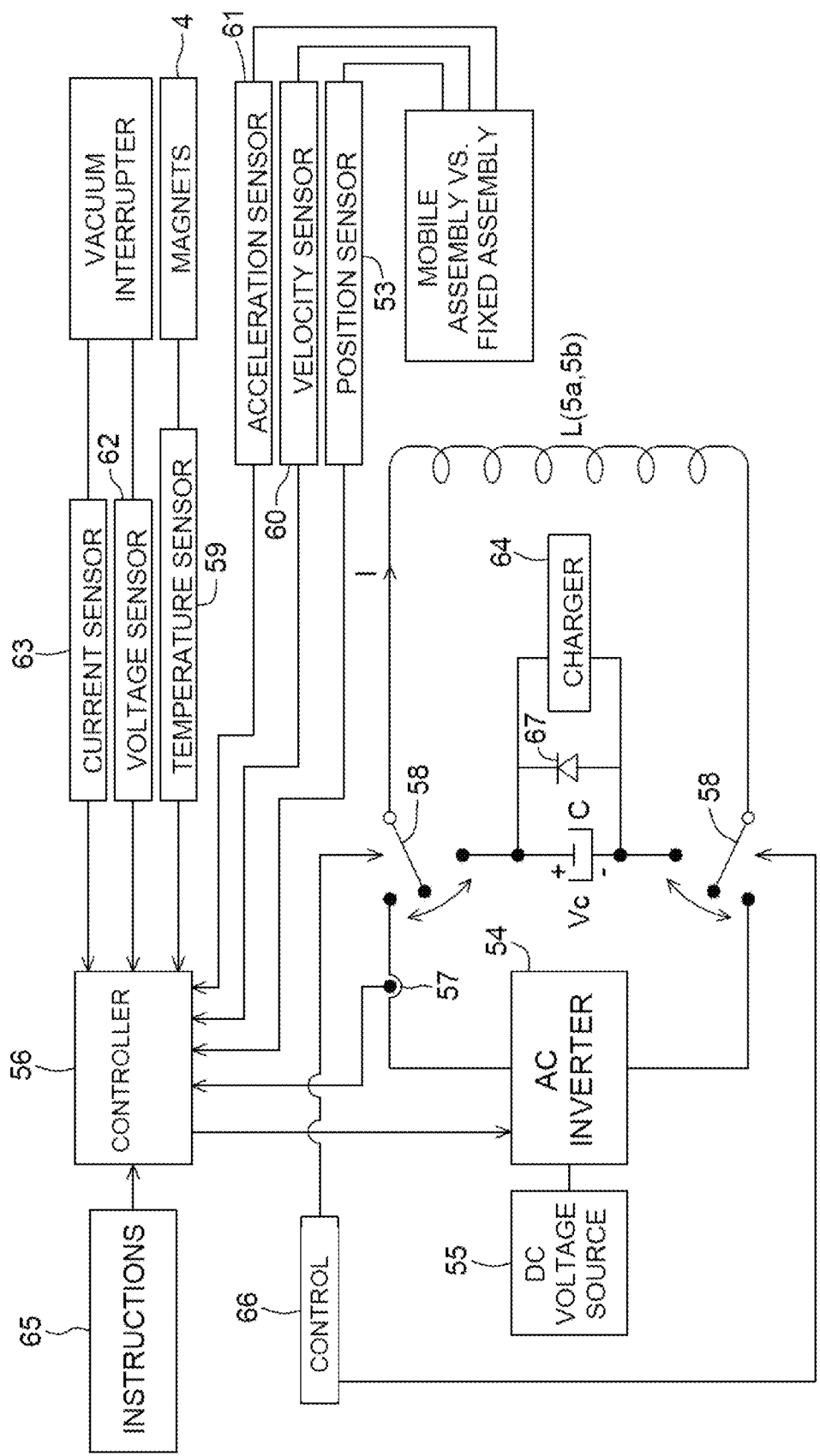
FIG. 17 is a schematic diagram illustrating a circuit for powering an actuator, according to an embodiment.

With the actuator of the present embodiment, it is possible to control the dynamics of the displacement of the mobile assembly of the actuator connected on the mobile contact of a vacuum interrupter by servo-controlling the force of the actuator in relation to parameters such as: its position, temperature, speed, acceleration, and/or time. In an embodiment that is shown in FIG. 17, the coils 5a, 5b of the actuator are connected via two switches 58 to an electrical power source capable of driving the current I injected into the coils 5a, 5b of the actuator in relation to the movement of the mobile assembly. This power source may be, for example as shown in FIG. 17, a controller 56 connected to: the position sensor 53 to determine the position of the mobile assembly with respect to the fixed assembly in real time; a current sensor 57 to determine the current I in real time; and a power solid state AC inverter 54 combined with a DC voltage source 55. Based on instructions received by the controller 56 through an external input 65, the controller 56 drives the AC inverter 54 to dictate the magnitude and direction of the current I flowing through the actuator coils 5a, 5b from information transmitted by the position sensor 53 and the current sensor 57. To refine the control, the embodiment may further include a temperature sensor 59 connected to the controller 56 to determine the temperature of the magnets 4 in real time in order to compensate for its influence on the magnetization of the magnets, and thus, on the force produced. Although it is possible to calculate the velocity and acceleration of the mobile assembly by sampling the position in real time, further refinement of the control can be achieved in an embodiment further comprising a velocity sensor 60 and/or an acceleration sensor 61 connected to the controller 56 to determine the velocity and/or acceleration of the mobile assembly relative to the fixed assembly in real time. The information from the sensors transmitted regularly to the controller thus allows the magnitude and direction of the current I injected into the coils to be controlled according to the various conditions of the actuator. A time control of the actuator can be performed by incorporating in the embodiment a voltage sensor 62 connected to the controller 56 to determine the voltage across the contacts of the vacuum interrupter in real time and a current sensor 63 also connected to the controller 56 to determine the current flowing through the vacuum interrupter in real time in order to synchronize the actuation of the vacuum interrupter with the electrical network where it is mounted. The embodiment may further incorporate a digital duplicate of the entire actuator mechanism and vacuum interrupter in a digital memory, which can also include a model of the electronic power inverter. The database of the digital duplicate can be updated with data collected during operation, for example: the wear level of the vacuum interrupter contacts. The controller can use this digital duplicate and the operation history to optimize the operation of the actuator with the vacuum interrupter. The displacement of the mobile assembly coupled to the mobile contact of a vacuum interrupter includes an end-of-movement limited impact actuation mode. The possible contact gap is in the displacement $\lambda \leq x \leq (M-\lambda)$. The position with the contacts closed corresponds to $x=\lambda+\beta-\sigma$, where $\beta$ is a reserve displacement to accommodate the gradual wear of the vacuum interrupter contacts after the break-in period has passed, and $\sigma$ represents the elastic deformation of the structure caused by the holding force (I=0). The position $x=M-\lambda$ corresponds to the maximum opening gap with the mobile assembly pressed against the stop. For the purpose of description: the vacuum interrupter contacts are initially closed and this state is shown with the mobile assembly (plunger-cores 7) placed on the left in FIG. 2. FIG. 6 shows the evolution of four parameters: current I; actuating force F; speed of the mobile assembly V; and position x, all as a function of time T. The current I injected by the AC inverter into the coils 5a, 5b is controlled by the controller in relation to the information received from the sensors. The magnetic force F produced on the mobile assembly along its displacement is shown in FIG. 7. The six instants $T_0$ to $T_5$ indicated in FIG. 6 are shown in FIG. 7. The driving of the actuator connected to the mobile contact to the vacuum interrupter proceeds as follows.

At time $T=T_0$, the current I=0, and a negative force is applied to the mobile assembly by the force balance belonging to the plunger-core 7 located on the right in FIG. 2. This negative force is added to the restoring force of the vacuum interrupter to produce the holding force. At this point, the controller drives the AC inverter to impose a current I=100% $I_n$ in coils 5a, 5b and transfer the greater balance of force to the plunger-core 7 located on the left in FIG. 2. The rise of the current I is not instantaneous. The self-reactance of the coils 5 opposes a counter-electromotive voltage to the AC inverter which affects the rate of change of the current I. The force F exerted on the mobile assembly reverses to reach the positive amplitude corresponding to the point $T_1$ referenced in FIG. 7 at the moment the current I reaches 100% $I_n$. The force F generated by the actuator now opposes and overcomes the restoring force. The resultant force then accelerates the mobile mass comprising the actuator mechanism and the moving contact. The mobile assembly gains velocity and it rapidly advances toward the right end of the movement in FIG. 2. During the progression, the force F remains almost constant, as shown in FIG. 7 by the continuous line drawn between points $T_1$ and $T_2$ on a portion of the broken line corresponding to the force profile for a current I=100% $I_n$. At instant $T_2$, the mobile assembly has reached a position close to the midpoint. This instant, determined by the controller, corresponds to a condition where deceleration must be initiated in order to reach the end of the movement smoothly. The controller then drives the AC inverter to change the polarity of the current I=−100% $I_n$ to transfer the greater balance of forces to the plunger-core 7 located on the right. During the transition, the mobile assembly nevertheless continues its progression. At time $T_3$, the current I=−100% $I_n$ and now subjects the mobile mass to a negative deceleration force combined with the restoring force. During deceleration, the negative force applied to the mobile assembly remains nearly constant, as shown in FIG. 7 by the solid line drawn between times $T_3$ and $T_4$ on a portion of the broken line corresponding to the force profile for current $I=-100\% I_n$. A major portion of the kinetic energy acquired during acceleration is then returned as electrical energy to the DC voltage source through the AC inverter. At time $T_4$, the mobile mass is nearing the end of its movement and has lost most of its velocity. The controller drives the AC inverter at this instant to force the current I to drop to zero as the position reaches the stop point $x=M-\lambda$ with almost zero velocity. This condition is reached at time $T_5$. When the current I is brought back to zero (I=0), the balance of forces is then given back to the plunger-core 7 located on the left to counteract the restoring force and keep the contacts open. Thanks to these means, the opening of the contacts of a vacuum interrupter is carried out without exceeding the prescribed distance when reaching the end of the movement and without producing a bounce. Among other things, this method of actuation allows the movement impulse applied to the bellows to be attenuated. When the vacuum interrupter is actuated in an energized electrical network, the time $T_0$ of the opening triggering can be decided with a predetermined advance on the next zero crossing of the AC current flowing through the vacuum interrupter to limit the duration of the arc between the contacts.

Figure 8:
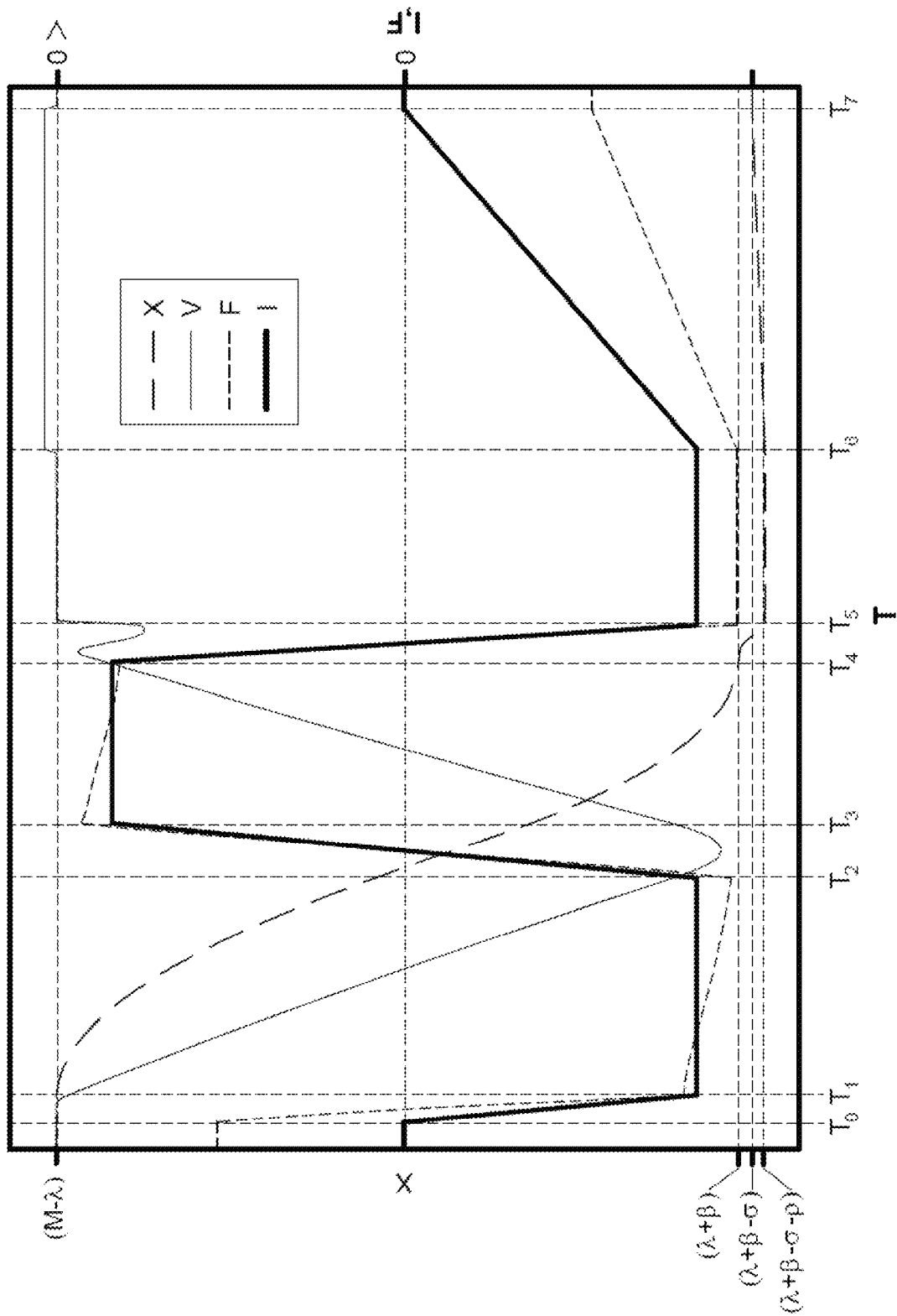
FIG. 8 is a graph showing the position, velocity, force and current of the actuator as a function of position in a second drive mode.

The same operating mode also applies when causing the contacts to close by reversing the polarity in the sequence of the controlled current I. This mode, shown in FIG. 8, is however different from that of FIG. 6 in that at time $T_4$, the controller drives the AC inverter to inject a current $I=-100\% I_n$ in order to press the contacts with maximum force from the moment they meet, rather than pressing only with the holding force produced by the magnets. This maximum force counteracts the restoring force produced when a short duration overcurrent is passed. The mobile assembly of the actuator then reaches the position $x=\lambda+\beta-\sigma-\rho$, where $\rho$ represents the additional deformation associated with the difference between the force at current I and the holding force at current I=0. Once the overcurrent has passed, the current I is driven to gradually reduce it to zero between instants $T_6$ and $T_7$, and thus make room for the holding force produced by the magnets. The mobile assembly of the actuator then returns to the holding position $x=\lambda+\beta-\sigma$. When the vacuum interrupter actuation is actuated in an energized electrical network, the time $T_0$ of the closure initiation can be decided by the controller to synchronize the time $T_4$ with a zero crossing of the AC voltage alternation present across the vacuum interrupter. This synchronization contributes to limit the overcurrent flowing through the vacuum interrupter at the time of contact closure.

Figure 9:
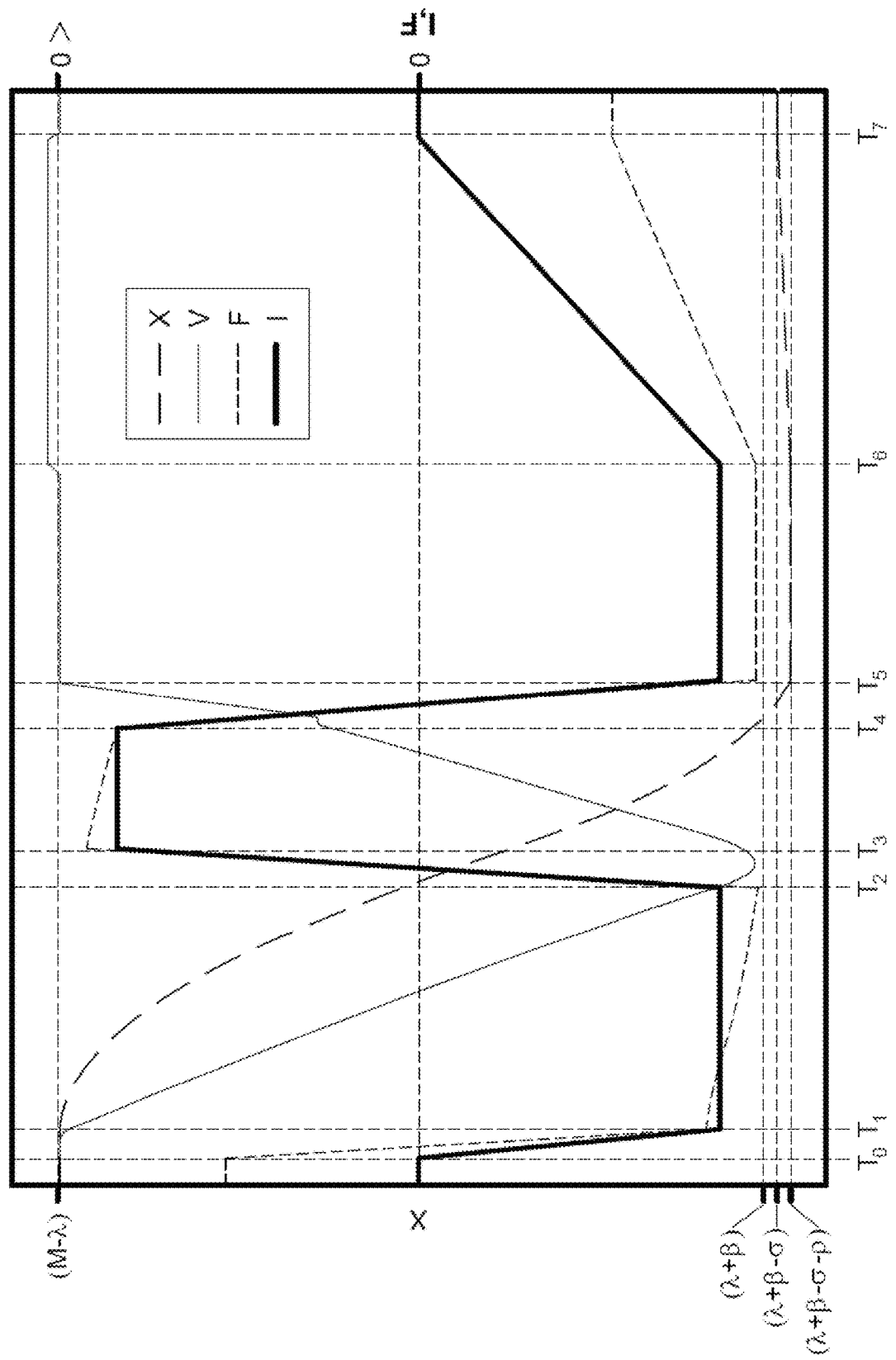
FIG. 9 is a graph showing the position, velocity, force and current of the actuator as a function of position in a third drive mode.

As can be appreciated, the dielectric strength between the vacuum interrupter contacts drops below the medium voltage threshold over the last third of the movement. An arc will occur if the voltage wave exceeds the dielectric strength before the contacts meet. However, arcing can be restricted to a few electrical degrees around the zero crossing if the last third of the movement is completed at a predetermined average speed. This prescribed speed then ensures superior dielectric strength throughout the approach during the descent of the voltage wave prior to its zero crossing. It is then possible that the limited impact closure mode cannot satisfy this speed. In this case, the actuator of the present embodiment provides an alternative for closing. The second closing mode consists in delaying the instant $T_2$ to increase the average speed over the last third of the movement to the required value. Acting in this way inevitably has an impact on the contact at the end of the movement. This second mode nevertheless has the advantage of limiting the energy at impact, in addition to controlling the bounces. FIG. 9 illustrates this mode. First, although there is an impact, it occurs at minimum energy since the last third of the movement is only decelerated. Deceleration removes kinetic energy from the mobile assembly by returning that energy to the DC voltage source of the AC inverter. Therefore, the impact occurs at a reduced kinetic energy. Then, it is possible to limit the bounce, or even avoid it, by altering the way the actuator is driven. As soon as the impact occurs, part of the kinetic energy of the mobile mass is stored as potential energy in an elastic deformation of the structure. It is the reconversion of this potential energy into kinetic energy applied to the mobile assembly and in the opposite direction that can create the bounce. In the present mode, the bounce is countered by driving the current I at time $T_4$ to reverse the force to apply a pressing force at time $T_5$. The time $T_5$ is determined to coincide with the time when the elastic deformation reaches its maximum. The magnitude of the current I at $T_5$, and thus the holding force, is adjusted to oppose a force equal to the force generated by the elastic deformation. The addition of this force at this precise moment makes it possible to retain the elastic deformation and thus limit the restitution of energy which favors bounce. The force is maintained until time $T_6$, the time for the system to stabilize. The force is then gently reduced to the holding force produced by the magnets at time $T_7$, by bringing the current I to zero.

Figure 10:
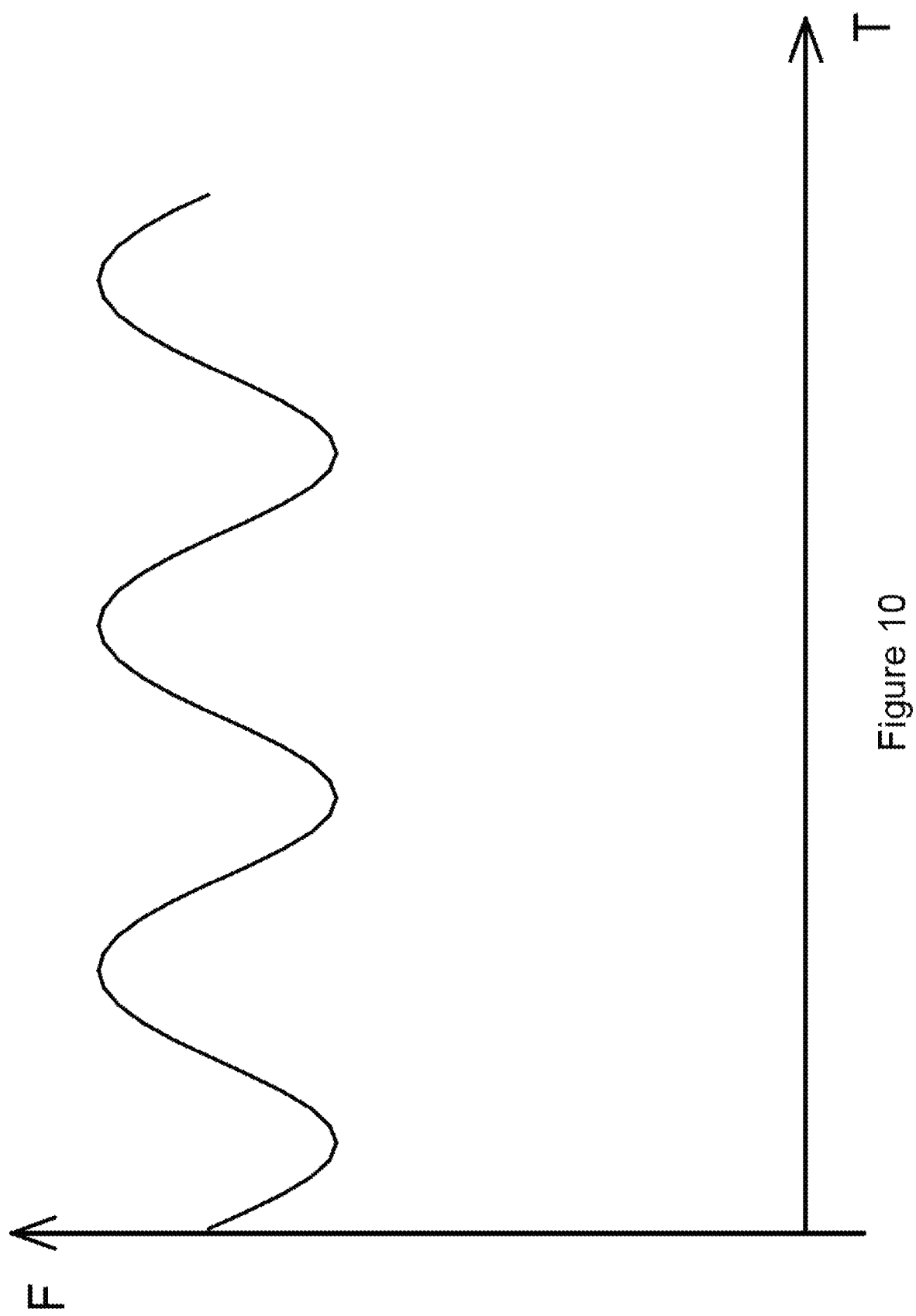
FIG. 10 is a graph showing the change in force over time when an alternating current is superimposed on a current set point to add a vibratory mode to the actuation force.

The actuator of the present embodiment further includes an actuation mode to unblock the mobile assembly when ice accumulates in its gaps, or to break a solder point that has formed between the contacts. FIG. 10 shows the evolution over time of the force produced by the actuator when the current I injected into the actuator coils has an alternating component of a given frequency. This current I can be generated by the AC inverter by adding a time alternating signal to the current I set point. The actuator then produces a constant force plus an oscillatory component that causes the mobile part to vibrate in order to unlock it.

The actuator of the present embodiment further comprises a dynamic mode to counteract mechanical oscillations in the structure. In response to an oscillation caused by, for example, the impact on the closing of the contacts of a vacuum interrupter, the controller can cause the AC inverter to inject, in addition to the actuating current I, an oscillatory current component I whose amplitude and phase are adjusted to produce a force wave that suppresses said oscillation.

The actuator of the present embodiment further comprises an actuation mode for toggling the mobile assembly using an auxiliary source in the event of the failure of the AC inverter and/or its controller. As illustrated in FIG. 17, the actuator may include an external control 66 use switched 58 to disconnect the failed AC inverter and allow the connection of a capacitor C previously charged to a voltage by a charger 64. The sudden connection of the capacitor C to the coils 5a, 5b causes the transfer of its potential energy, $\frac{1}{2}CV_c^2$, to the proper inductance L of the coils 5a, 5b of the actuator which stores this energy in the magnetic circuit with a current $I=\sqrt{C/L}V_c$. Once the capacitor is discharged, a diode 67 placed in antiparallel to its terminals takes over the current I flowing in the coils 5a, 5b. This current I is then gradually reduced by Joule heating. The rise followed by the loss of current I ensures the toggling of the mobile part. This mode can be required, for example, to force the closing of a vacuum interrupter in a switching apparatus mounted on a multi-beam transmission line.

FIGS. 11, 12, 13, 14, 15, and 16 show an actuator as described above according to one manner of assembly.

Figure 11:
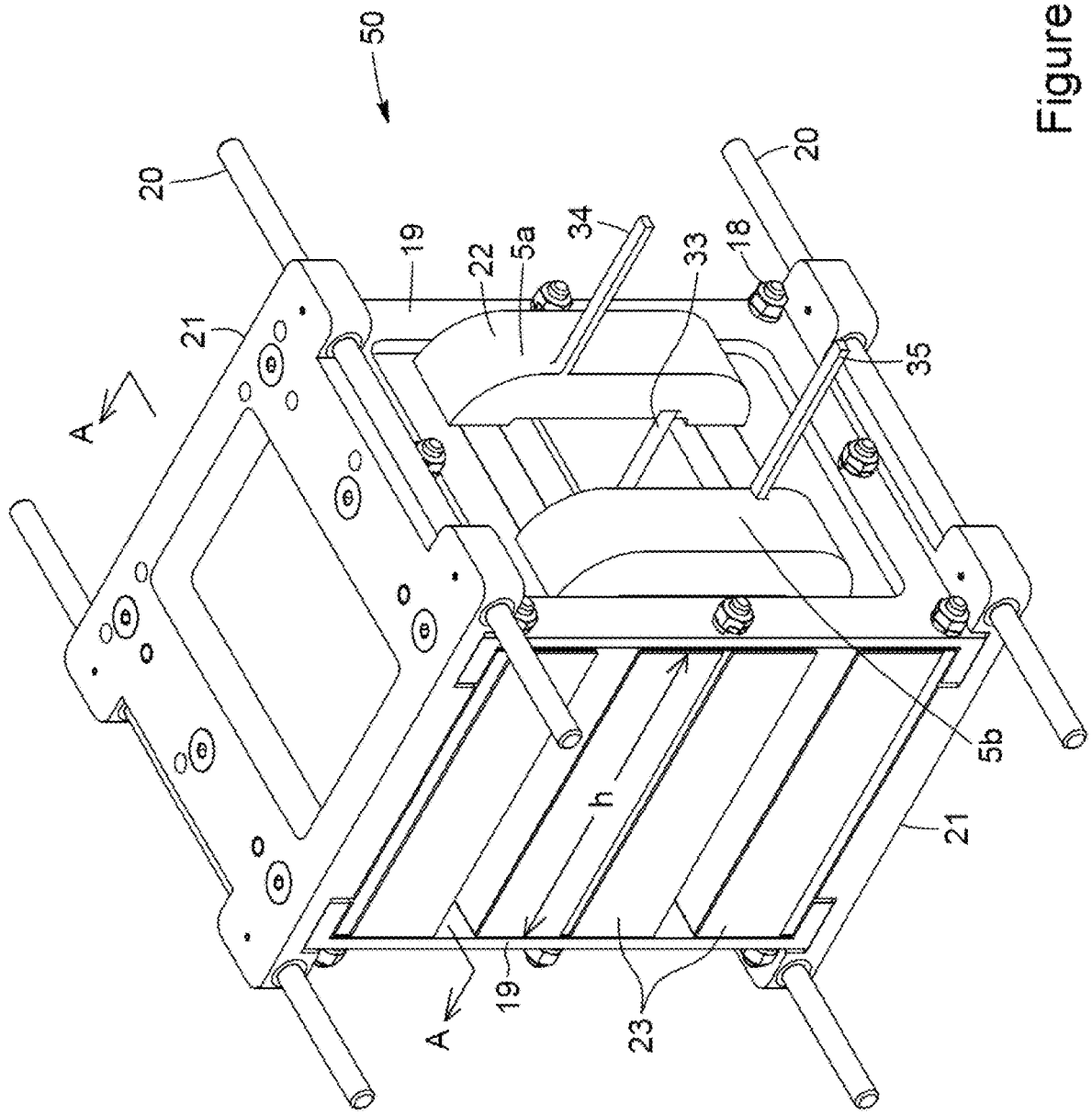
FIG. 11 is a perspective view of the fixed actuator assembly, according to an embodiment.
Figure 12:
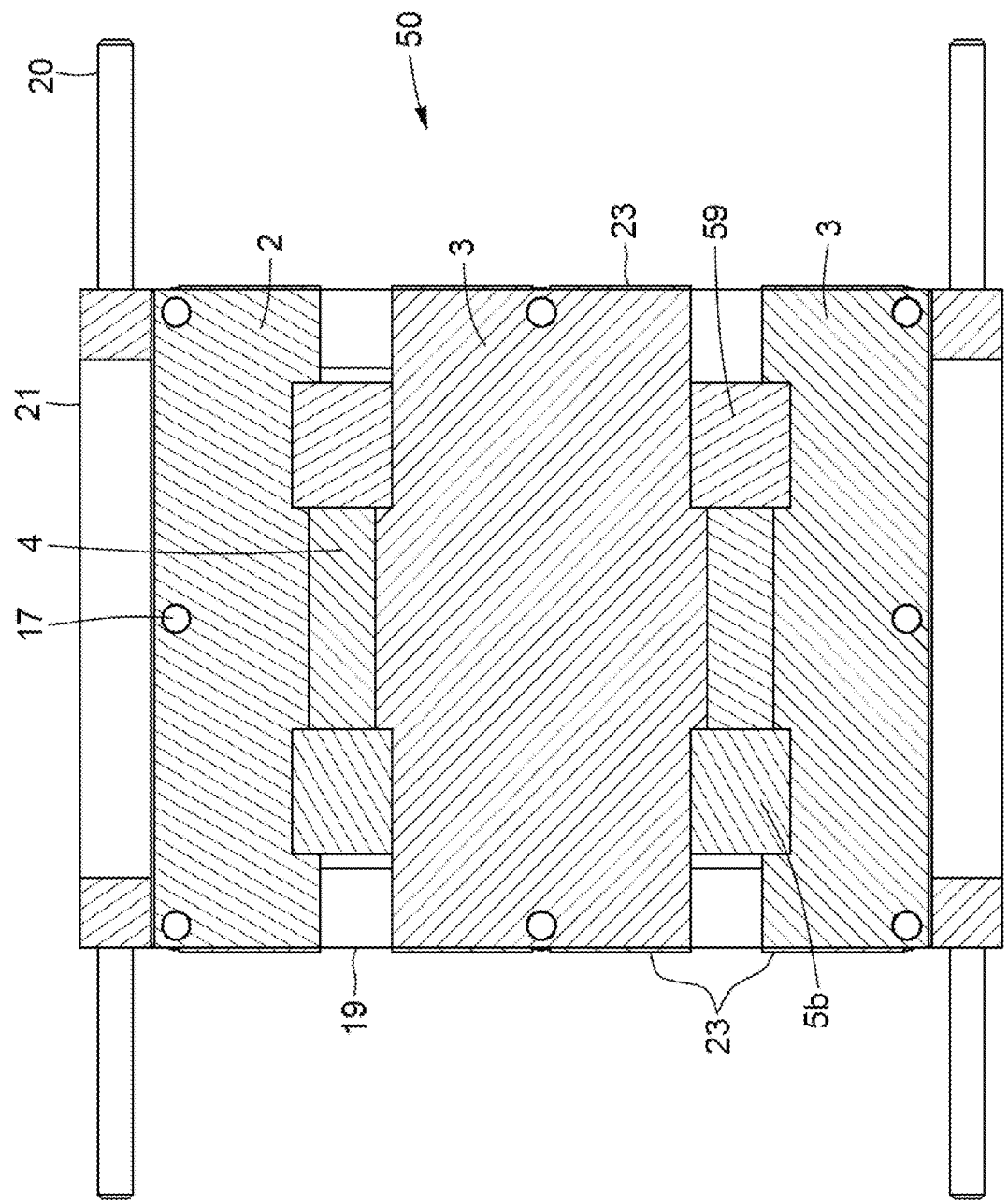
FIG. 12 is a cross-sectional view of the fixed assembly of the actuator of FIG. 11, taken along line A-A.

FIGS. 11 and 12 show the fixed assembly 50 comprising the fixed cores 2 and 3, magnets 4 and coils 5a, 5b of the magnetic circuit shown in FIG. 1. The fixed cores 2 and 3 have holes 17 to allow the passage of anchor rods 18 to retain the cores with the supports 19. These holes are made in the regions of the fixed cores so as not to disturb the flux. Guiding rods 20 are placed on both sides of the fixed assembly and are attached to supports 21 which are attached to the supports 19. These rods 20 serve as a guiding element to cooperate with a guiding element in the mobile assembly to allow the mobile assembly to move between a first and a second stable position. The supports 19 are provided with a window to clear the heads 22 of the coils 5a, 5b. The two coils 5a, 5b are electrically connected in series by the connection 33. The two coils as a whole can be connected to a power source capable of generating a controlled current, such as an inverter, through the two terminals 34 and 35. In the present embodiment, the supports 19 and 21 are made of a material that is non-magnetic, rigidly strong and of low mass density. The side faces of the cores 2 and 3 are covered with a thin rubber pad 23 of thickness λ.

Figure 13:
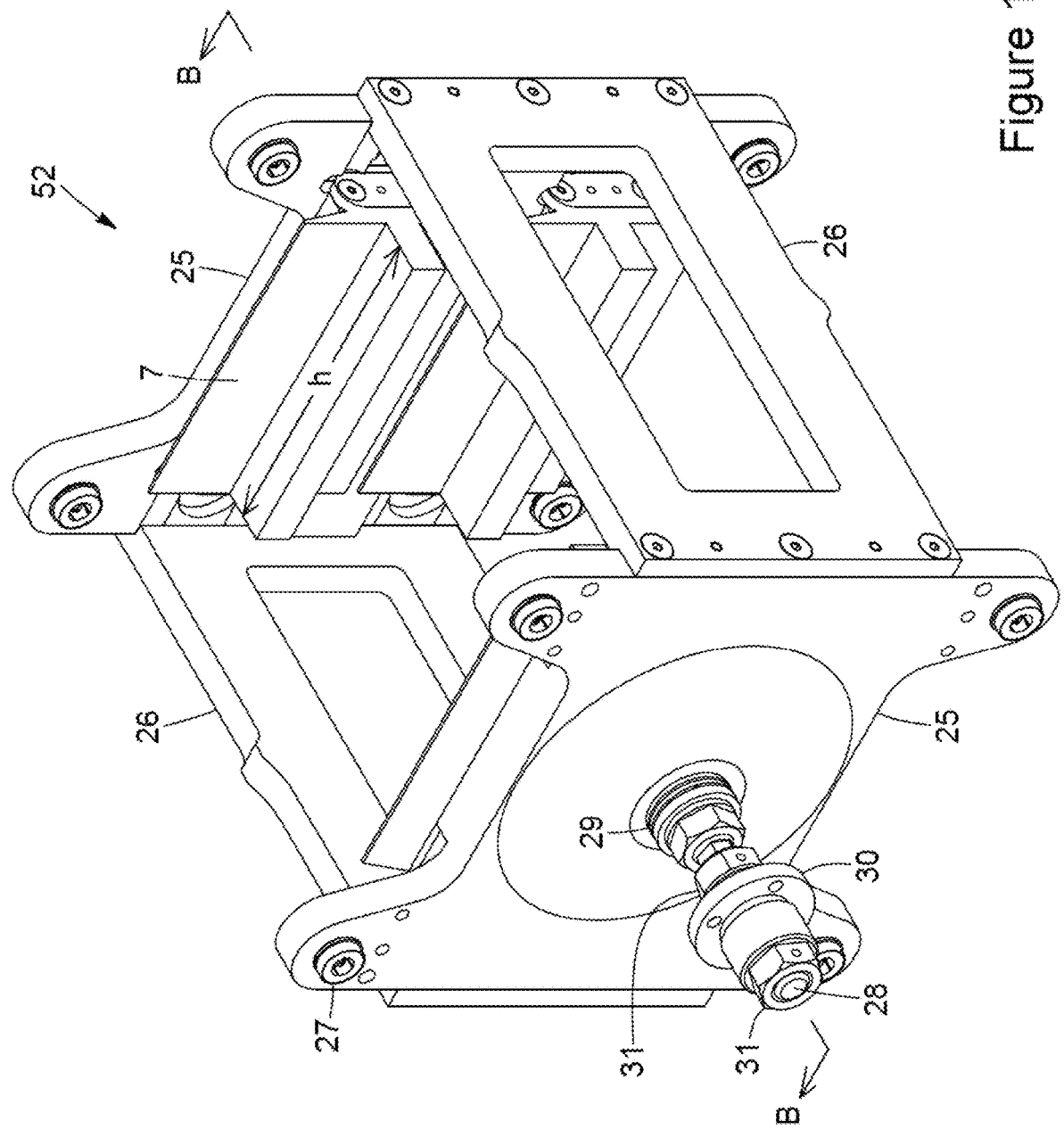
FIG. 13 is a perspective view of the mobile assembly of the actuator, according to an embodiment.
Figure 14:
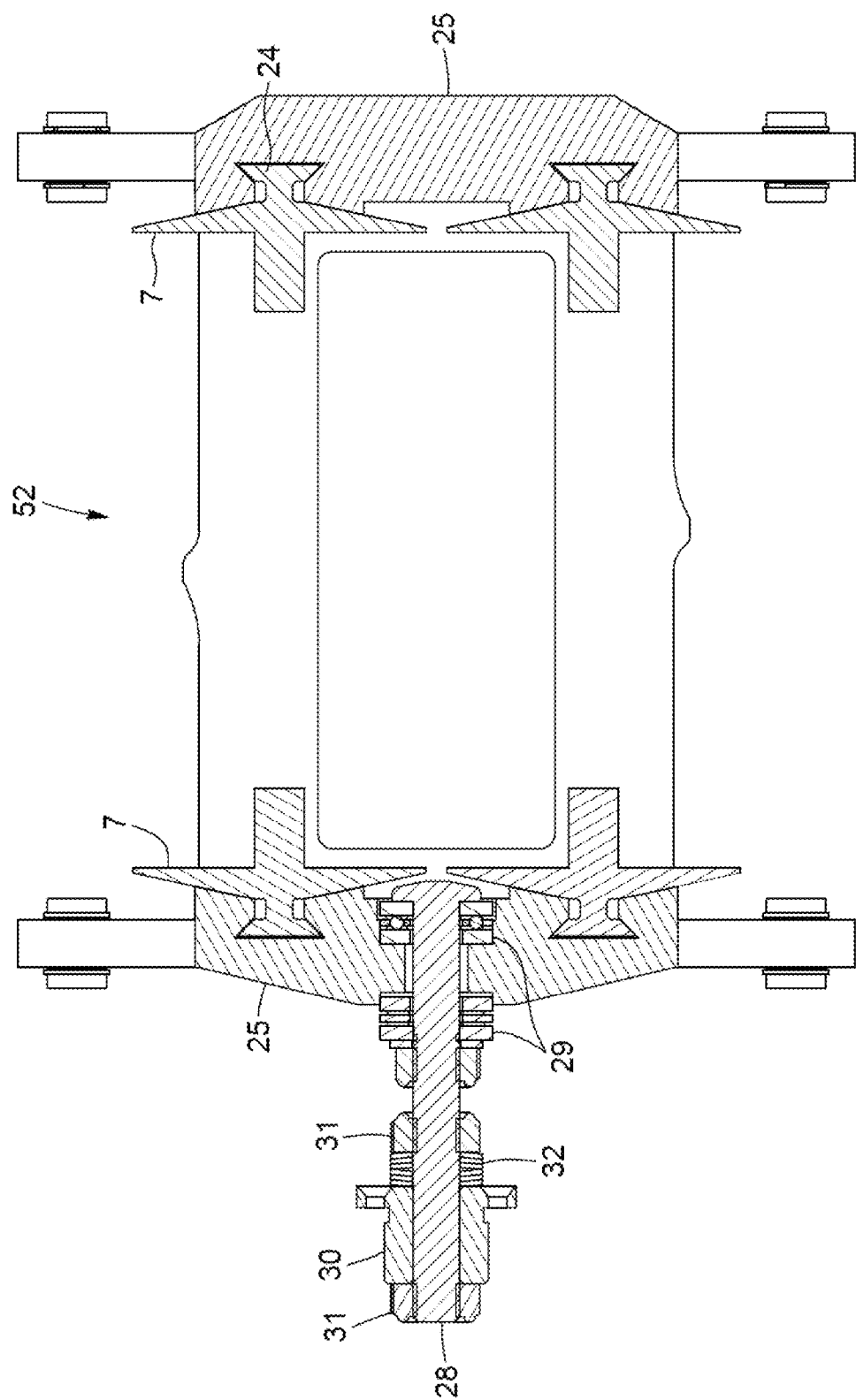
FIG. 14 is a cross-sectional view of the mobile actuator assembly of FIG. 13, taken along line B-B.

FIGS. 13 and 14 show the mobile assembly 52 comprising the plunger-cores 7 of FIG. 1. Each plunger-core 7 is securely supported by anchor means 24 on a support 25. The supports 25 are held in opposition with a predetermined gap by supports 26 to bridge the pair of plunger-cores 7 located at the ends. The gap between the supports 26 allows insertion of the fixed assembly while maintaining clearance to allow movement. In the present embodiment, the supports 25 and 26 are made of a material that is non-magnetic, rigidly strong and of low mass density. Each support 25 contains sliding bearings 27 serving as a guiding element to cooperate with the guiding element of the fixed assembly 50. In the present embodiment, each sliding bearing 27 is intended to receive a guide rod 20 on which it can slide freely with minimal friction. One of the two supports 25 includes an arm 28 retained at its base between two ball bearings 29 embedded in the corresponding support 25. By the action of the two ball bearings 29, the arm 28 is free to pivot on its axis. The arm 28 is attached to the load to be moved via an adapter 30. In the present embodiment, the load to be moved is the mobile contact of a vacuum interrupter, but it is appreciated that other loads are possible. The free pivoting movement of the arm 28 ensures that no rotational stress is applied to the vacuum interrupter bellows. The adapter 30 is mounted and retained on the arm 28 by two fasteners 31 placed on each side. Alternatively, the adapter 30 may be directly clamped onto the arm shaft 28 by the two clamps 31, or indirectly via a friction spring 32. The addition of a friction spring 32, in the present embodiment corresponding to a parallel/serial stack of Belleville washers, decouples a portion of the mobile mass of the actuator from the mobile contact of the vacuum interrupter by compressing the friction spring onto the adapter 30 as the arm 28 pushes on the adapter 30. The frictional nature of the friction spring 32 serves to prevent oscillatory movement of the mobile contact after impact with the fixed contact to prevent bounce.

Figure 15:
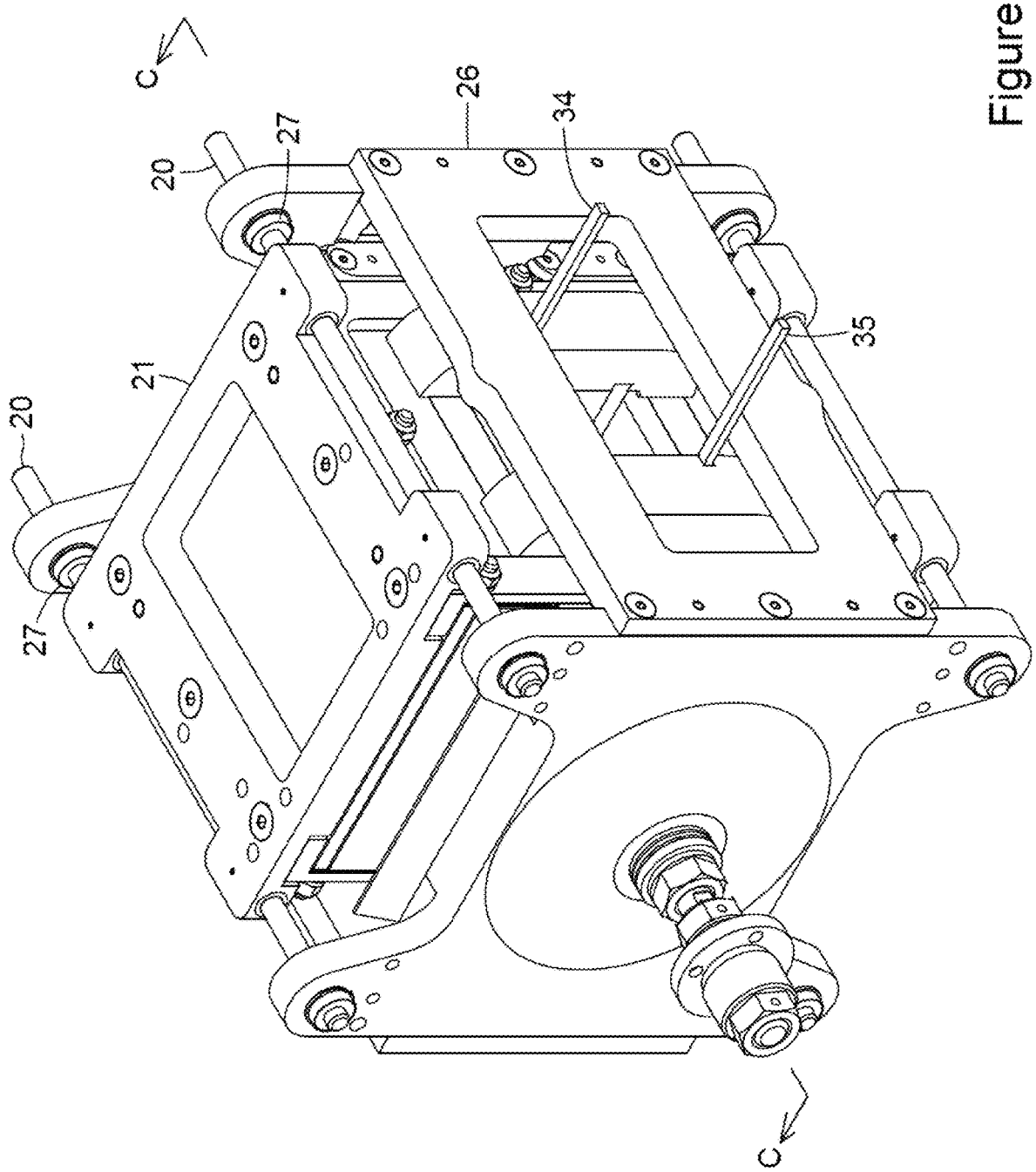
FIG. 15 is a perspective view of the actuator according to an embodiment.
Figure 16:
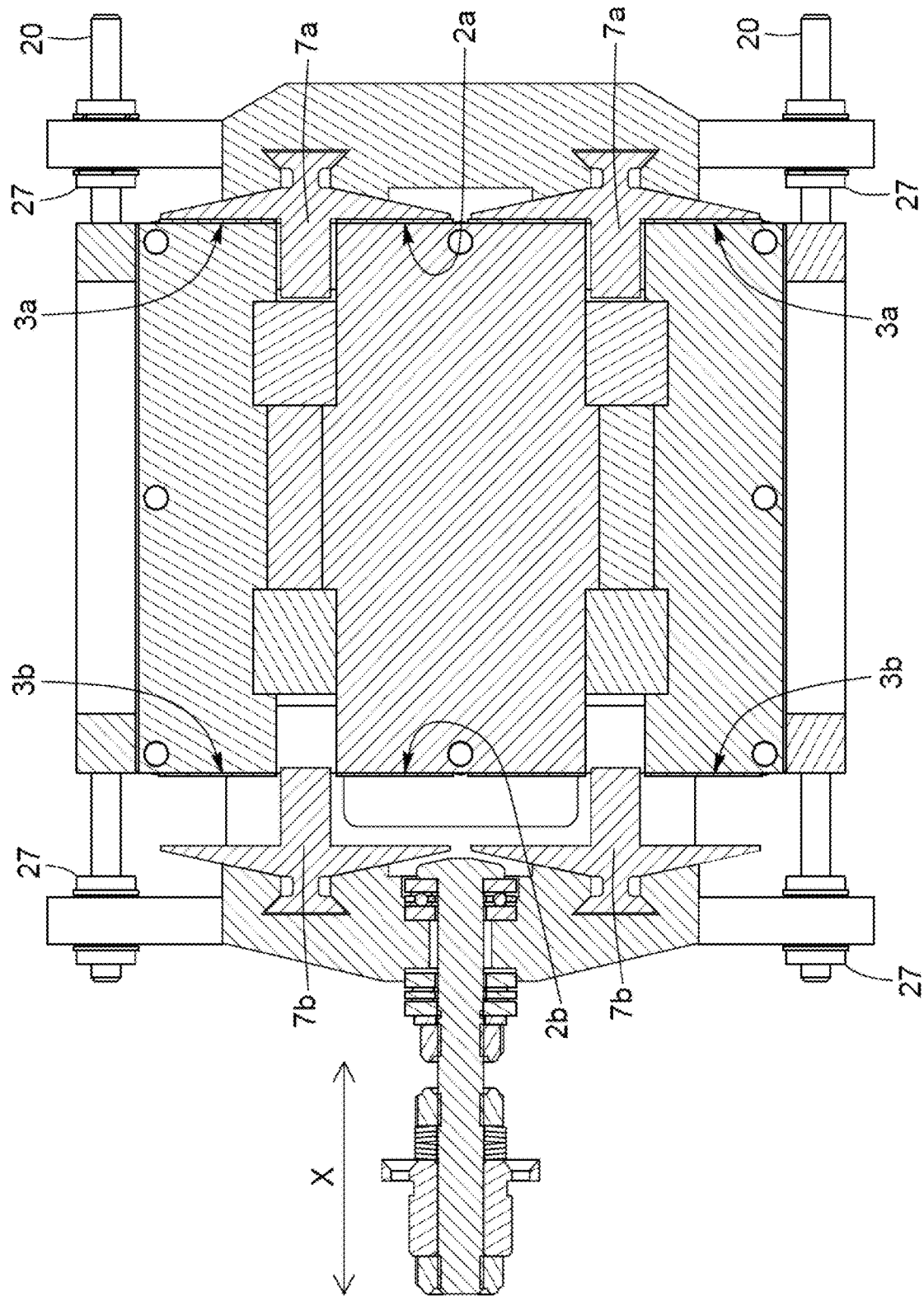
FIG. 16 is a cross-sectional view of the actuator of FIG. 15, taken along line C-C.

FIGS. 15 and 16 show the mobile assembly assembled with the fixed assembly. Each guiding rod 20 can slide on a sliding bearing 23 to allow reciprocating movement of the plunger-cores along the "x" axis, allowing the mobile assembly 52 to move between a first stable position where the caps of a first pair of plunger-cores 7a are secured to a first side face 2a, 3a of the actuator core, and a second stable position where the caps of a second pair of plunger-cores 7b are docked on a second lateral face 2b, 3b of the actuator core opposite the first face 2a, 3a. The actuator can be mounted on the structure supporting the interrupter uses fastening means, not shown, which attach to the supports 21.

The embodiments described above are provided by way of example and are not limiting. It is within the ability of the person skilled in the art to make modifications and variants to the described embodiments without departing from the scope of the invention.

The invention claimed is:

1. A bistable electromagnetic actuator for actuating at least one mobile contact of a vacuum interrupter, the actuator comprising:
   a mobile assembly including:
      at least one pair of ferromagnetic plunger-cores facing one another, each ferromagnetic plunger-core having a body comprising a protuberance with sidewalls and a cap;
      a frame jointly connecting the plunger-cores; and
      a guiding element; and
   a fixed assembly including:
      a ferromagnetic core having two opposite sides, the ferromagnetic core having cavities defined on each of the sides configured to receive a corresponding one of the plunger-cores from the mobile assembly;
      each cavity having sidewalls defining a first gap therebetween;
      each sidewall of each cavity defining a second gap with an opposite sidewall of its corresponding plunger-core,
      the opposite sides of the ferromagnetic core respectively facing opposite surfaces of the caps of the ferromagnetic plunger-cores, each side of the ferromagnetic core defining a third gap with the opposite surface of the corresponding cap;
      at least one magnet positioned between the cavities in the ferromagnetic core, said at least one magnet being suitable to create a first magnetic flux in the first, second and third gaps;
      at least one coil operable via an excitation current to create a second magnetic flux in the first, second and third gaps; and
      a guiding element configured to cooperate with the guiding element of the mobile assembly to allow the mobile assembly to move between a first and a second stable position.

2. The bistable electromagnetic actuator according to claim 1, wherein the guiding element of the fixed assembly cooperates with the guiding element of the mobile assembly such that while the mobile assembly moves between the first and second stable positions, the volumes of the third gaps on each side of the core together define a total volume that remains constant.

3. The bistable electromagnetic actuator according to claim 1, wherein the guiding element of the fixed assembly cooperates with the guiding element of the mobile assembly such that while the mobile assembly moves between the first and second stable positions, the first, second and third gaps together define a volume having two fixed dimensions and one variable dimension that varies linearly with the movement of the mobile assembly.

4. The bistable electromagnetic actuator according to claim 3, wherein the variable dimensions of the first, second and third gaps on one of the sides of the ferromagnetic core vary in inverse proportion to the corresponding variable dimensions of the first, second and third gaps located on the opposite side of the ferromagnetic core.

5. The bistable electromagnetic actuator according to claim 1, wherein the guiding element of the fixed assembly cooperates with the guiding element of the mobile assembly such that while the mobile assembly moves between the first and second stable positions, the volumes of the first and second gaps on the two opposed sides of the ferromagnetic core together define a volume that remains constant.

6. The bistable electromagnetic actuator according to claim 1, wherein the actuator comprises two pairs of plunger-cores symmetrically positioned on either side of a central axis of the actuator extending parallel relative to the pairs of protuberances, the ferromagnetic core comprising two pairs of cavities each configured to receive therein a respective pair of the two pairs of plunger-cores.

7. The bistable electromagnetic actuator according to claim 1, wherein the ferromagnetic core comprises a central armature and two lateral armatures, the central armature being positioned between the two lateral armatures.

8. The bistable electromagnetic actuator according to claim 7, wherein the fixed assembly comprises two magnets, each being located between the central armature and one of the lateral armatures.

9. The bistable electromagnetic actuator according to claim 7, wherein the at least one coil is wound around the central armature.

10. The bistable electromagnetic actuator according to claim 7, wherein the central armature and the two lateral armatures extend past the at least one coil over a predetermined distance to define the cavities.

11. The bistable electromagnetic actuator according to claim 1, wherein the fixed assembly comprises two coil sections located on each side of the at least one magnet.

12. The bistable electromagnetic actuator according to claim 11, wherein the two coil sections are connected in series.

13. The bistable electromagnetic actuator according to claim 12, wherein the at least one magnet comprises a rectangular transverse cross-section.

14. The bistable electromagnetic actuator according to claim 13, wherein the protuberances of the plunger-cores comprise uniform rectangular transverse cross-sections.

15. The bistable electromagnetic actuator according to claim 14, wherein the guiding element of the mobile assembly cooperates with the guiding element of the fixed assembly such that while the mobile assembly moves between the first and second stable positions, the protuberances of the plunger-cores remain at least in part within their corresponding cavities, and the opposite surfaces of the caps of the plunger-cores do not contact the sides of the ferromagnetic core.

16. The bistable electromagnetic actuator according to claim 15, wherein the cap and the protuberance of the plunger-cores are "T" shaped.

17. The bistable electromagnetic actuator according to claim 16, wherein the caps of the plunger-cores each comprise: a base from which the protuberance extends perpendicularly, the base having a thickness; and wings that extend from opposite sides of the base perpendicularly to the protuberance along a length, the wings defining the opposite surface of the cap.

18. The bistable electromagnetic actuator according to claim 17, wherein the sidewalls of the plunger-cores are separated from the sidewalls of the cavities by a distance, said distance and a ratio of the thickness of the cap bases to the length of the cap wings being selected such that a nominal excitation current in said at least one coil creates a nominal magnetic flux that saturates the cap bases, the protuberances of the plunger-cores, and portions of the core adjacent the cavities; the nominal excitation current being a minimum excitation current necessary to induce a relatively constant force as the mobile assembly moves between the first and second stable positions.

19. The bistable electromagnetic actuator according to claim 17, wherein the wings are tapered, the wings each having a thickness that gradually decreases toward their free end.

20. The bistable electromagnetic actuator according to claim 1, wherein the actuator comprises a first sensing means for determining a position of the mobile assembly relative to the fixed assembly in real time.

21. The bistable electromagnetic actuator according to claim 20, wherein the first sensing means comprises an optical, inductive, capacitive or powered encoder or proximity sensor.

22. The bistable electromagnetic actuator according to claim 20, wherein the controller comprises a second sensing means for determining the temperature of the at least one magnet in real time.

23. The bistable electromagnetic actuator according to claim 20, wherein the actuator comprises a power source and a third detection means for determining the current flowing in the at least one coil in real time to modulate at least one of the following parameters of the excitation current: amplitude and direction.

24. The bistable electromagnetic actuator according to claim 23, wherein the power source comprises a controller connected to the first, second and third sensing means for controlling said at least one of the parameters of the excitation current according to at least one of the following parameters of the fixed assembly relative to the mobile assembly: position, velocity, acceleration and direction.

25. The bistable electromagnetic actuator according to claim 1, wherein the actuator comprises a cushioned mechanical stop positioned between the opposite sides of the ferromagnetic core and corresponding opposite surfaces of the plunger-core caps.

26. The bistable electromagnetic actuator according to claim 25, wherein the cushioned mechanical stop comprises a rubber pad secured to each of the opposite sides of the ferromagnetic core.

27. The bistable electromagnetic actuator according to claim 1, wherein the guiding element of the fixed assembly comprises guiding rods fixed to a support on either side of the core, and the guiding element of the mobile assembly comprises sliding bearings that each receive a corresponding one of the guiding rods, allowing a back-and-forth movement of the mobile assembly.

28. The bistable electromagnetic actuator according to claim 27, wherein the mobile assembly includes an arm adapted to connect the mobile assembly to the mobile contact of the vacuum interrupter.

29. The bistable electromagnetic actuator according to claim 28, wherein the arm comprises a base and the frame comprises ball bearings, the base of the arm being retained by the ball bearings, the ball bearings allowing the arm to pivot about an axis.

30. The bistable electromagnetic actuator according to claim 1, wherein the actuator comprises a primary power source connected to the at least one coil to modulate the excitation current, a secondary power source comprising a capacitor, and a controller configured to disconnect the primary power source, connect the secondary power source, and discharge energy from the capacitor into the at least one coil causing the mobile assembly to move between the first and second stable positions.

31. A method of operating a mobile contact of a vacuum interrupter to break or form a conductive connection, the mobile contact being connected to a mobile assembly of a bistable electromagnetic actuator, the method comprising the steps of:
   a) causing an excitation current I to flow through a coil of the actuator in a first direction to produce a magnetic flux in the actuator causing the mobile assembly to accelerate during a first portion of movement from a first stable position to a second stable position; and
   b) when the mobile assembly is in motion toward the second stable position, causing the excitation current I to flow in the coil in a second direction opposite to the first direction to slow the mobile assembly during a second portion of the movement
   wherein steps a) and b) further comprise:
      detection at least one of the following parameters; positions, velocity, direction and acceleration of the mobile assembly, and temperature of the at least one magnet of the fixed assembly; and
      varying at least one of the following parameters of the excitation current in accordance with the at least one of the detected parameters; magnitude and direction.

32. The method according to claim 31, wherein the excitation current I corresponds to a nominal current $I_n$ causing a first magnetic flux in an air gap on a first side of a core of the actuator, the first flux opposing a second magnetic flux in the air gap created by a permanent magnet such that a resulting magnetomotive force on the mobile assembly on the first side of the core is approximately 0.

33. The method according to claim 32, wherein in step a), the excitation current I corresponds to 100% of the nominal current $I_n$, and in step b), the excitation current I corresponds to -100% of the nominal current $I_n$.

34. The method according to claim 31, wherein an accelerating force acting on the mobile assembly during the first portion of the movement is relatively constant along the first portion of the movement, and wherein a decelerating force acting on the mobile assembly during the second portion of the movement is relatively constant along the second portion of the movement.

35. The method according to claim 31, further comprising a step of cutting off the excitation current in the coil such that when the mobile assembly arrives at the second position, the mobile assembly is retained in the second stable position by a magnetic flux produced by a permanent magnet in the actuator, thereby reducing bounce.

36. The method according to claim 31 further comprising a step of causing the excitation current to flow in the first direction again for a predetermined period, such that when the mobile assembly arrives at the second position, the mobile assembly is retained in the second stable position by a magnetic flux produced in the coil and/or by a magnetic flux produced by a permanent magnet in the actuator, thereby reducing bounce.

37. The method according to claim 31, further comprising a step of synchronizing the movement of the mobile assembly to the first or second positions with a zero crossing of a voltage across the vacuum interrupter.

38. The method according to claim 31, further comprising a step of synchronizing the movement of the mobile assembly to the first or second positions with a zero crossing of a current flowing through the vacuum interrupter.

39. The method according to claim 31, wherein step b) further comprises a step of slowing the movement of the mobile assembly by converting at least part of its kinetic energy into electrical energy via the coil.

40. The method according to claim 39, wherein the excitation current is provided to the coil via a power source, and wherein the electrical energy generated in step b) is returned to the power source.

41. The method according to claim 31, further comprising the steps of: disconnecting the electromagnetic actuator from a primary power source comprising an inverter; connecting the electromagnetic actuator to an auxiliary power source comprising a capacitor; and discharging the capacitor causing excitation current to flow through the coil in the first or second direction, causing the mobile assembly to move towards the first or second position.

42. The method according to claim 31, wherein steps a) and b) are repeated at a given frequency causing vibration of the mobile assembly.

43. The method according to claim 31, further comprising a step of causing an oscillating current to flow through the coil to produce a force wave on the mobile assembly.

44. The method according to claim 42, wherein the oscillating current is superimposed on the excitation current I flowing in the first or second direction.

45. The method according to claim 42, wherein at least one of the following parameters of the oscillating current is adjusted to counteract mechanical oscillations in the vacuum interrupter or in the electromagnetic actuator: amplitude and phase.

* * * * *